US012479089B2

(12) United States Patent
Lim

(10) Patent No.: US 12,479,089 B2
(45) Date of Patent: Nov. 25, 2025

(54) SWARM ROBOT CONTROL APPARATUS AND METHOD

(71) Applicant: HL Robotics Co., Ltd., Seongnam (KR)

(72) Inventor: Joonhoo Lim, Yongin-si (KR)

(73) Assignee: HL Robotics Co., Ltd., Seongnam (KR)

( * ) Notice: Subject to any disclaimer, the term of this patent is extended or adjusted under 35 U.S.C. 154(b) by 125 days.

(21) Appl. No.: 17/965,928

(22) Filed: Oct. 14, 2022

(65) Prior Publication Data

US 2023/0118011 A1  Apr. 20, 2023

(30) Foreign Application Priority Data

Oct. 18, 2021 (KR) .................. 10-2021-0138316

(51) Int. Cl.
*B25J 9/16* (2006.01)
*G05D 1/00* (2006.01)
*G05D 1/02* (2020.01)

(52) U.S. Cl.
CPC ............. *B25J 9/161* (2013.01); *B25J 9/1664* (2013.01); *G05D 1/02* (2013.01)

(58) Field of Classification Search
CPC ............ B25J 9/161; B25J 9/1664; G05D 1/02
See application file for complete search history.

(56) References Cited

U.S. PATENT DOCUMENTS

| 9,488,981 | B2* | 11/2016 | Pillai | G05D 1/0027 |
| 10,537,996 | B2* | 1/2020 | Egerstedt | G05D 1/0027 |
| 2010/0128041 | A1* | 5/2010 | Branets | G06T 17/20 |
| | | | | 345/441 |
| 2017/0072565 | A1* | 3/2017 | Egerstedt | G05D 1/0027 |

* cited by examiner

*Primary Examiner* — Adam D Tissot
(74) *Attorney, Agent, or Firm* — Harvest IP Law, LLP

(57) ABSTRACT

A swarm robot control apparatus and method according to various aspects of the present disclosure can improve the patrol and surveillance efficiency of swarm robots. The swarm robot control apparatus includes: an area designation unit that designates assigned areas for a plurality of robots based on respective current locations of the plurality of robots including a first robot; a start point selection unit that selects one of a plurality of moving points defined by a first assigned area as a start moving point for the first robot, based on information on distances between the first robot and a plurality of moving points of the assigned area defined for the first robot and information on whether there is an overlap between the first robot and other robots at the moving points of the first assigned area; and a robot controller that moves the first robot to the start moving point selected by the start point selection unit.

17 Claims, 25 Drawing Sheets

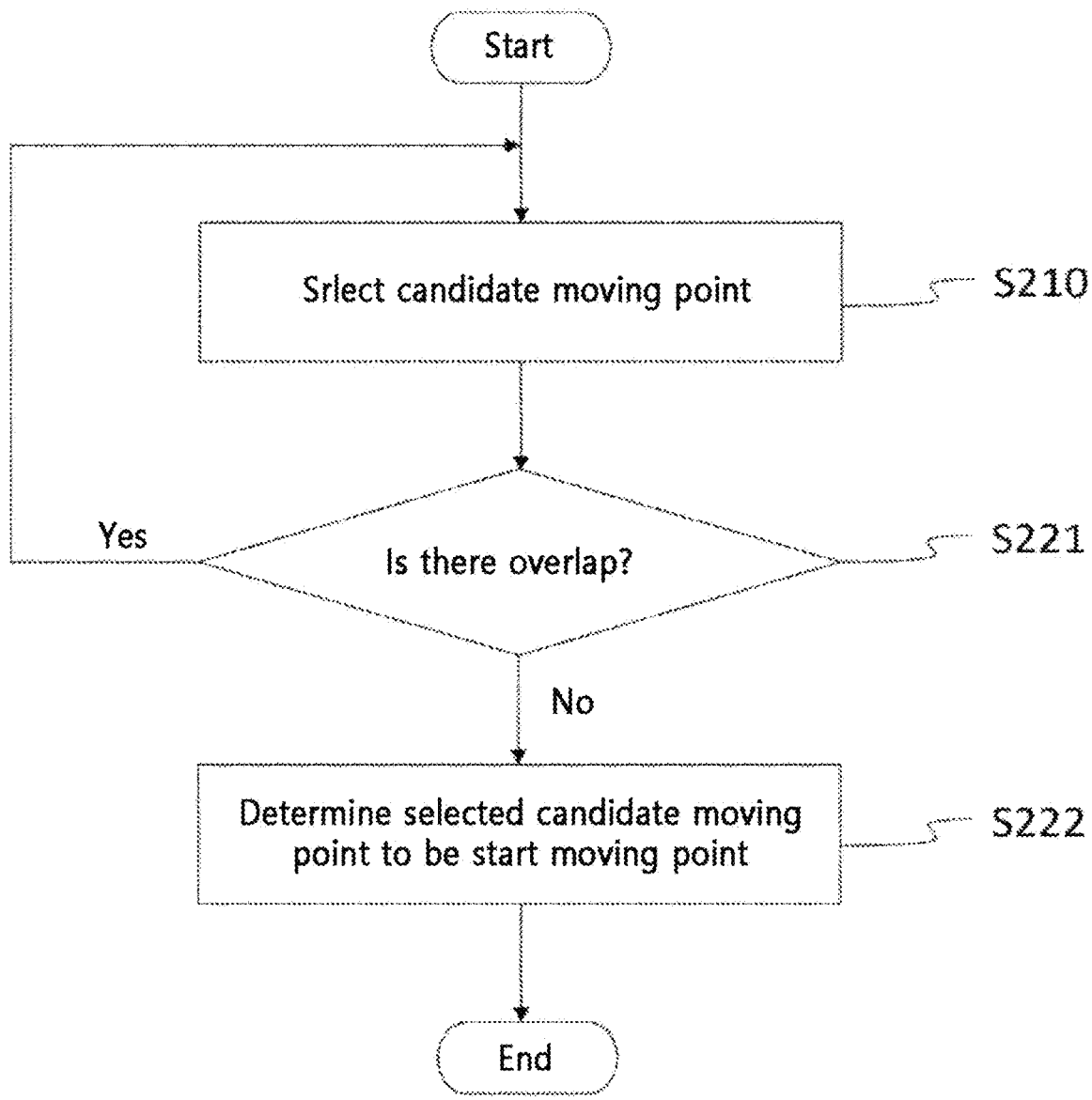

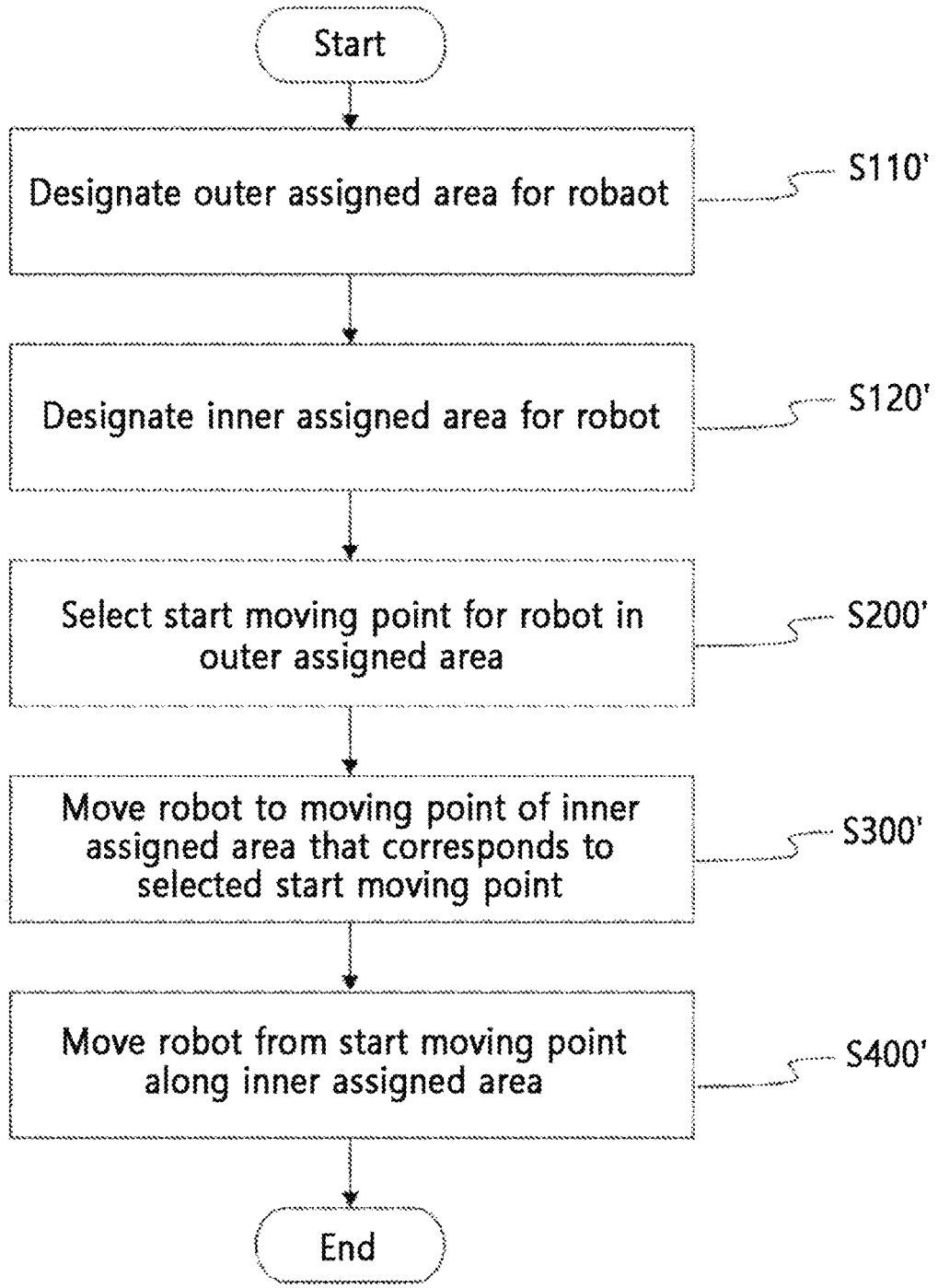

SWARM ROBOT CONTROL APPARATUS AND METHOD

CROSS-REFERENCE TO RELATED APPLICATION

This application claims the benefit of priority under 35 U.S.C. § 119 to Korean Patent Application No. 10-2021-0138316, filed on Oct. 18, 2021, in the Korean Intellectual Property Office (KIPO), the disclosure of which is incorporated by reference herein in its entirety.

TECHNICAL FIELD

The present disclosure relates to a swarm robot control apparatus, and more particularly, to a swarm robot control apparatus and method that can improve the patrol and surveillance efficiency of swarm robots by preventing overlap in areas (or patrol areas or surveillance areas) assigned to robots forming a swarm.

BACKGROUND

Robotics has been advancing steadily even to this day, and the range of application of robots is currently becoming broader and broader due to the diversity in the fields of robotics. However, its application technologies are developing at a slow pace, hardly keeping up with the demand for robots.

Even though robotics is not quite advanced enough, research is being conducted on swarm robot systems for performing various tasks and providing efficient operation. There are various types of swarm robots depending on the type and control system of robots forming a swarm. In this regard, researchers have established and developed systems that suit each swarm robot's purposes.

The information disclosed in the Background section above is to aid in the understanding of the background of the present disclosure, and should not be taken as acknowledgement that this information forms any part of prior art.

SUMMARY

An aspect of the present disclosure is to provide a swarm robot control apparatus and method that can improve the patrol and surveillance efficiency of swarm robots by preventing overlap in areas (or patrol areas or surveillance areas) assigned to robots forming a swarm.

An embodiment of the present disclosure provides swarm robot control apparatus including: an area designation unit that designates assigned areas for a plurality of robots based on respective current locations of the plurality of robots including a first robot; a start point selection unit that selects one of a plurality of moving points defined by a first assigned area as a start moving point for the first robot, based on information on distances between the first robot and the plurality of moving points of the first assigned area defined for the first robot and information on whether there is an overlap between the first robot and other robots among the plurality of robots at the moving points of the first assigned area; and a robot controller that moves the first robot to the start moving point selected by the start point selection unit.

The start point selection unit may include: a candidate point selection unit that selects a nearest moving point to the first robot as a candidate moving point from among the plurality of moving points of the first assigned area; and a start point determination unit that determines whether to select the candidate moving point as the start moving point for the first robot, based on whether the first robot overlaps a second robot among the plurality of robots at the selected candidate moving point.

Upon determining that the first robot does not overlap the second robot at the candidate moving point, the start point determination unit may determine the candidate moving point to be the start moving point for the first robot.

Upon determining that the first robot and the second robot overlap at the candidate moving point, the start point determination unit may send a reselection signal to the candidate point selection unit, and in response to the reselection signal, the candidate point selection unit may exclude a moving point corresponding to the candidate moving point from the plurality of moving points of the first assigned area, redesignate a rest of the moving points of the first assigned area, other than the excluded moving point corresponding to the candidate moving point, as a plurality of redesignated moving points of the first assigned area, and reselect a nearest moving point to the first robot as a second candidate moving point from among the redesignated moving points of the first assigned area.

The robot controller may control the first robot to move to another moving point of the first assigned area when the first robot has arrived at the start moving point.

The robot controller may control the first robot to move to other points of the first assigned area sequentially in a preset direction from the start moving point of the first assigned area.

The preset direction may include either a clockwise direction or a counterclockwise direction from the start moving point of the first assigned area.

A start moving point for the second robot may be set earlier than the start moving point for the first robot.

The area designation unit may designate the assigned areas for the plurality of robots using a Voronoi diagram, based on the respective current locations of the plurality of robots including the first robot.

The moving points of the first assigned area may include vertices of the first assigned area.

When there are at least two nearest moving points to the first robot from among the plurality of moving points of the first assigned area, the candidate point selection unit may compare angles between the at least two moving points and the direction the first robot is heading in to each other, and select one of the at least two moving points as the candidate moving point based on a result of comparing the angles.

The candidate point selection unit may select a moving point whose angle to the direction the robot is heading in is the smallest as the candidate moving point, from among the at least two moving points.

When there is no more moving points that can be reselected by the candidate point selection unit in response to the reselection signal, the start point determination unit may determine the nearest moving point to the first robot, among the plurality of moving points initially defined by the first assigned area, to be the start moving point for the first robot.

Another embodiment of the present disclosure provides a swarm robot control apparatus including: an outer area designation unit that designates outer assigned areas for a plurality of robots based on respective current locations of the plurality of robots including a first robot; an inner area designation unit that designates inner assigned areas defined within the respective outer assigned areas and having a smaller area than the respective outer assigned areas; a start point selection unit that selects one of a plurality of moving points defined by a first outer assigned area as a start moving point for the first robot, based on information on distances between the first robot and the plurality of moving points of the first outer assigned area defined for the first robot and information on whether there is an overlap between the first robot and other robots among the plurality of robots at the moving points of the first outer assigned area; and a robot controller that moves the first robot to a start moving point of the first inner assigned area that corresponds to the start moving point selected by the start point selection unit.

The first inner assigned area for the first robot may have the same shape as the outer assigned area for the first robot.

Another embodiment of the present disclosure provides a swarm robot control method including: an area designation step of designating assigned areas for a plurality of robots based on respective current locations of the plurality of robots including a first robot; a start point selection step of selecting one of a plurality of moving points defined by a first assigned area as a start moving point for the first robot, based on information on distances between the first robot and the plurality of moving points of the assigned area defined for the first robot and information on whether there is an overlap between the first robot and other robots among the plurality of robots at the moving points of the first assigned area; and a robot movement step of moving the first robot to the selected start moving point.

The start point selection step may include: a candidate point selection step of selecting a nearest moving point to the first robot as a candidate moving point from among the plurality of moving points of the first assigned area; and a determination step of determining whether to select the candidate moving point as the start moving point for the first robot, based on whether the first robot overlaps a second robot at the selected candidate moving point.

The determination step may include, upon determining that the first robot does not overlap the second robot at the candidate moving point, determining the candidate moving point to be the start moving point for the first robot.

The determination step may include, upon determining that the first robot and the second robot overlap at the candidate moving point, sending a candidate reselection request to the candidate point selection unit, and the candidate selection step may include, in response to the candidate reselection request, excluding a moving point corresponding to the candidate moving point from the plurality of moving points of the first assigned area, redesignating a rest of the moving points of the first assigned area, other than the excluded moving point corresponding to the candidate moving point, as a plurality of redesignated moving points of the first assigned area, and reselecting a nearest moving point to the first robot as a second candidate moving point from among the redesignated moving points of the first assigned area.

The robot movement step may further include an additional movement step of moving the first robot to another moving point of the first assigned area when the first robot has arrived at the start moving point.

The additional movement step may include moving the first robot to other points of the first assigned area sequentially in a preset direction from the start moving point of the first assigned area.

The area designation step may include designating the assigned areas for the plurality of robots using a Voronoi diagram, based on the current locations of the plurality of robots including the first robot.

The candidate selection step may include, when there are at least two nearest moving points to the first robot, comparing angles between the at least two moving points and the direction the first robot is heading in to each other, and selecting one of the at least two moving points as the candidate moving point based on a result of comparing the angles.

The candidate point selection step may include selecting a moving point whose angle to the direction the robot is heading in is the smallest as the candidate moving point, from among the at least two moving points.

The determination step may include, when there is no more moving points that can be reselected in the candidate point selection step in response to the reselection request, determining the nearest moving point to the first robot, among the initial plurality of moving points of the first assigned area, to be the start moving point for the first robot.

Another embodiment of the present disclosure provides a swarm robot control method including: an outer area designation step of designating an outer assigned area for a plurality of robots based on respective current locations of the plurality of robots including a first robot; an inner area designation step of designating inner assigned areas within the respective outer assigned areas and having a smaller area than the respective outer assigned areas; a start point selection step of selecting one of a plurality of moving points defined by a first outer assigned area as a start moving point for the first robot, based on information on distances between the first robot and the plurality of moving points of the first outer assigned area for the first robot and information on whether there is an overlap between the first robot and other robots among the plurality of robots at the moving points of the first outer assigned area; and a robot control step of controlling the first robot to a start moving point of the first inner assigned area that corresponds to the start moving point selected by the start point selection unit.

According to a swarm robot control apparatus and method of the present disclosure, the patrol and surveillance efficiency of robots may be improved since their assigned areas do not overlap. Moreover, each assigned area may function as a geo-fencing area.

BRIEF DESCRIPTION OF THE DRAWINGS

FIG. 24 is a flowchart for explaining a determination step of FIG. 23.

FIG. 25 is a flowchart for explaining a swarm robot control method according to another embodiment of the present disclosure.

DETAILED DESCRIPTION

Figure 1:
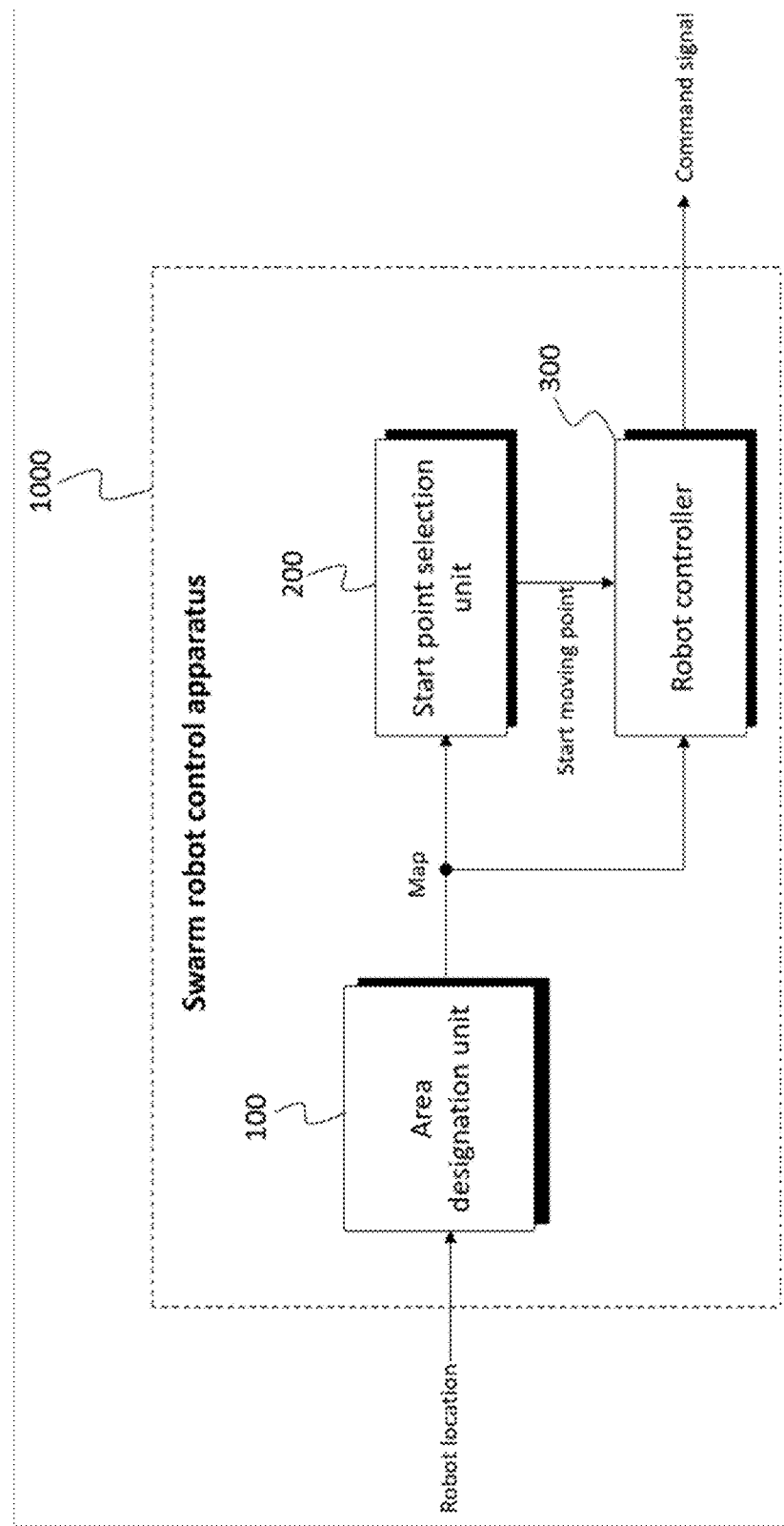
FIG. 1 is a block diagram of a swarm robot control apparatus according to one embodiment of the present disclosure.

Advantages and features of the present disclosure and methods for achieving them will become apparent with reference to the embodiments described below in detail in conjunction with the accompanying drawings. However, the present disclosure is not limited to the embodiments disclosed below but may be implemented in various different forms, the present embodiments are merely provided to make the disclosure of the present disclosure complete and to fully convey the scope of the present disclosure to those of ordinary skill in the art, and the present disclosure is defined only by the scope of the claims. Thus, in some embodiments, well-known process steps, well-known device structures, and well-known techniques are not described in detail in order to avoid obscuring the present disclosure. Like reference numerals refer to like elements throughout the specification.

In the drawings, the thicknesses of layers and regions are exaggerated for clarity. Like reference numerals in the drawings denote like elements throughout the specification.

The terms first, second, third, etc. in this specification may be used to describe various components, but such components are not limited by these terms. The terms are used for the purpose of distinguishing one element from another. For example, without departing from the scope of the present disclosure, the first component may be referred to as a second or third component, and similarly, the second or third component may be alternately named.

Unless otherwise defined, all terms (including technical and scientific terms) used in the present specification may be used in a sense that can be commonly understood by a person skilled in the art to which the present disclosure belongs. In addition, terms that are defined in a normally used dictionary are not ideally or excessively interpreted unless they are specifically defined clearly.

Hereinafter, a swarm robot control apparatus and method according to one embodiment of the present disclosure will be described below in detail with reference to FIGS. 1 to 25.

Figure 2:
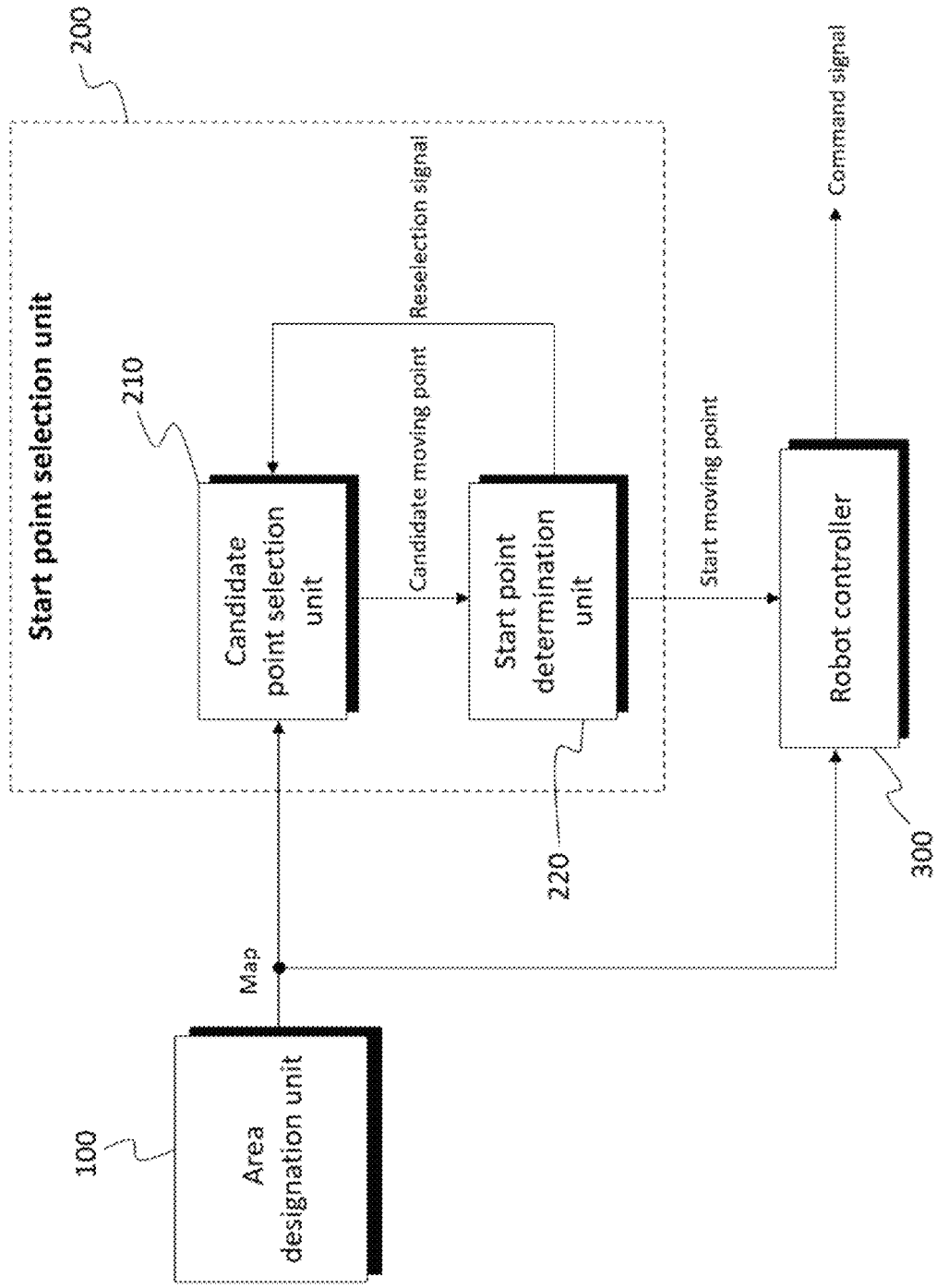
FIG. 2 is a detailed block diagram of a start point selection unit of FIG. 1.

FIG. 1 is a block diagram of a swarm robot control apparatus 1000 according to one embodiment of the present disclosure. FIG. 2 is a detailed block diagram of a start point selection unit 200 of FIG. 1.

The swarm robot control apparatus 1000 according to one embodiment of the present disclosure may include an area designation unit 100, a start point selection unit 200, and a robot controller 300, as illustrated in FIG. 1.

According to an exemplary embodiment of the present disclosure, the swarm robot control apparatus 1000 may include a processor (e.g., computer, microprocessor, CPU, ASIC, circuitry, logic circuits, etc.) and an associated non-transitory memory storing software instructions which, when executed by the processor, provides the functionalities of the area designation unit 100, the start point selection unit 200, and the robot controller 300. Herein, the memory and the processor may be implemented as separate semiconductor circuits. Alternatively, the memory and the processor may be implemented as a single integrated semiconductor circuit. The processor may embody one or more processor(s).

First, the swarm robot control apparatus 1000 according to the present disclosure may be installed at, for example, a control center for controlling robots.

The robots may be, for example, autonomous robots. In this instance, the robots may be autonomous-type patrol robots for patrolling a particular area, but the use of robots of the present disclosure are not limited thereto.

According to one embodiment of the present disclosure, swarm robots (or a swarm robot system) may mean, but are not limited to, a set of multiple robots of many types that simultaneously performs a given task in cooperation with other robots around them.

The area designation unit 100 may designate assigned areas for a plurality of robots, based on respective current locations of the plurality of robots forming a single swarm. For example, for fifteen robots (e.g., first to fifteenth robots) forming a swarm, the area designation unit 100 may designate first to fifteenth assigned areas enclosing the first to fifteenth robots. In this instance, a $k^{th}$ robot may be enclosed by a $k^{th}$ assigned area. Here, k may be a natural number greater than 1, and each assigned area may function as a geo-fencing area.

The area designation unit 100 may generate a map including coordinate information of each assigned area, coordinate information of each robot in each assigned area, coordinate information of moving points of each assigned area, and so on. Meanwhile, the aforementioned assigned area may be, for example, a patrol area of a robot or an area including that patrol area.

The start point selection unit 200 may select a start moving point for each robot. For example, based on a map provided by the area designation unit 100, the start point selection unit 200 may select one of a plurality of moving points defined on an area (hereinafter, first assigned area) assigned to a first robot as a start moving point for the first robot, select one of a plurality of moving points defined on an area (hereinafter, second assigned area) assigned to a second robot as a start moving point for the second robot, select one of a plurality of moving points defined on an area (hereinafter, third assigned area) assigned to a third robot as a start moving point for the third robot, . . . , select one of a plurality of moving points defined on an area (hereinafter, fourteenth assigned area) assigned to a fourteenth robot as a start moving point for the fourteenth robot, and select one of a plurality of moving points defined on an area (hereinafter, fifteenth assigned area) assigned to a fifteenth robot as a start moving point for the fifteenth robot.

Here, as an example, an operation in which the aforementioned start point selection unit 200 selects a start point for the first robot will be described below in detail.

For example, the start point selection unit 200 may extract information on distances between the first robot and the plurality of moving points defined by the assigned area for the first robot and information on whether there is an overlap between the first robot and other robots at the moving points of the first assigned area A1, based on information (e.g., map) provided from the area designation unit 100. Also, based on this extracted information, the start point selection unit 200 may select one of the plurality of moving points of the first assigned area A1 as the start moving point for the first robot.

To this end, the start point selection unit 200 may include a candidate point selection unit 210 and a start point determination unit 220, as in an example illustrated in FIG. 2.

The candidate point selection unit 210 selects the nearest moving point to the first robot from the plurality of moving points of the first assigned area, and designates the selected moving point as a candidate moving point. In other words, the candidate point selection unit 210 may select the moving point at the shortest distance from the first robot as a candidate moving point. To this end, as an example, the candidate point selection unit 210 may calculate the distances between the moving points of the first assigned area and the first robot individually, detect the shortest distance out of these calculated distances, and select the moving point at the detected shortest distance as a candidate moving point.

The start point determination unit 220 may determine whether the first robot overlaps a second robot (for example, spatially or temporally overlap) at the candidate moving point selected by the candidate point selection unit 210, and determine whether to select the candidate moving point as the start moving point for the first robot based on a result of the determination. For example, upon determining that the first robot does not overlap the second robot (or other robots) at the candidate moving point, the start point determination unit 220 may determine the candidate moving point to be the start moving point for the first robot. On the other hand, upon determining that the first robot and the second robot overlap at the candidate moving point, the start point determination unit 220 may determine the candidate moving point not to be the start moving point for the first robot. Instead, the start point determination unit 220 may send a reselection signal to the candidate point selection unit 210.

In response to the above reselection signal, the candidate point selection unit 210 excludes a moving point corresponding to the candidate moving point from the plurality of moving points of the first assigned area A1. In other words, the candidate point selection unit 210 excludes a moving point from the plurality of moving points of the first assigned area A1 once that moving point is deemed inappropriate based on a determination about whether there is an overlap. Afterwards, the candidate point selection unit 210 may redesignate the other moving points of the first assigned area A1, other than the excluded candidate moving point, as a plurality of redesignated moving points of the first assigned area A1, and reselect a candidate moving point based on the redesignated moving points (e.g., the other moving points other than the above inappropriate moving point) of the first assigned area A1. In other words, the candidate point selection unit 210 may reselect the nearest moving point to the first robot as a next-best candidate moving point from among the other moving points, other than the above inappropriate moving point (e.g., the other moving points of the first assigned area A1).

In this manner, the start point selection unit 200 may select start moving points for the other robots (e.g., the second to fifteenth robots). Here, the expression "the other robots" may refer to robots that are given a start moving point before the robot in question is. For example, when determining the start moving point for the third robot after the start moving point for the first robot has been determined first and then the start moving point for the second robot has been determined, the other robots (e.g., the other robots for the third robot) may be the first robot and the second robot. Here, the first to third robots may be robots that are disposed contiguous to each other.

The robot controller 300 may move each robot to a start moving point selected by the start point selection unit 200, based on coordinate information of the start moving point for each robot provided by the start point selection unit 200 and a map provided by the area designation unit 100. For example, the robot controller 300 may send a command to the first robot to have the first robot move to a particular moving point (e.g., start moving point) in the first assigned area, send a command to the second robot to have the second robot move to a particular moving point (e.g., start moving point) in the second assigned area, send a command to the third robot to have the third robot move to a particular moving point (e.g., start moving point) in the third assigned area, . . . , send a command to the fourteenth robot to have the fourteenth robot move to a particular moving point (e.g., start moving point) in the fourteenth assigned area, and send a command to the fifteenth robot to have the fifteenth robot move to a particular moving point (e.g., start moving point) in the fifteenth assigned area.

The above-described operation of the swarm robot control apparatus 1000 of the present disclosure will be described below in more detail with reference to FIGS. 3 to 16.

FIGS. 3 to 16 are views for explaining an operation of the swarm robot control apparatus 1000 according to one embodiment of the present disclosure.

For convenience of explanation, suppose that fifteen robots (e.g., first to fifteenth robots) form one swarm as an example.

Figure 3:
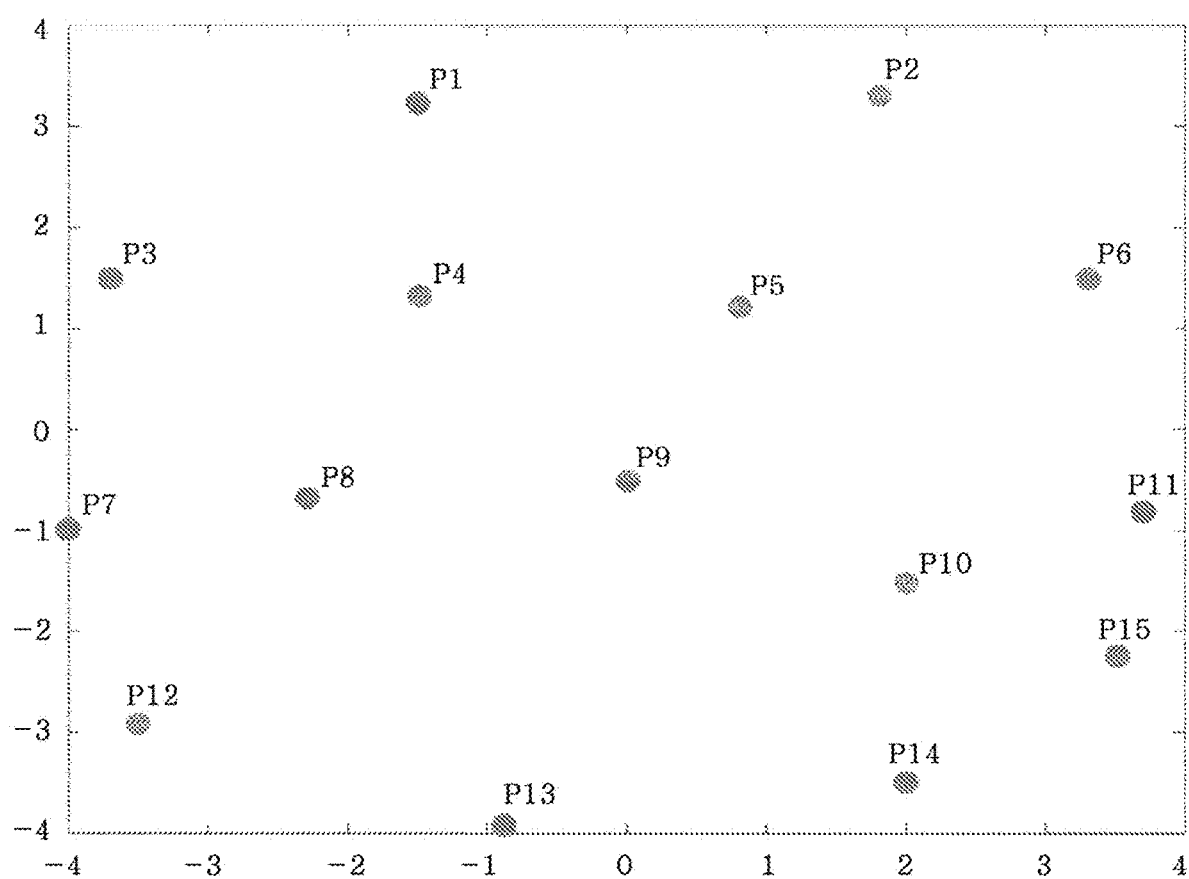
FIGS. 3, 4, 5, 6, 7, 8, 9, 10, 11, 12, 13, 14, 15 and 16 are views for explaining an operation of the swarm robot control apparatus according to one embodiment of the present disclosure.

FIG. 3 is a view showing a map of a two-dimensional coordinate system showing coordinates of the first to fifteenth robots.

In FIG. 3, P1 denotes two-dimensional coordinates for a current location of the first robot, P2 denotes two-dimensional coordinates for a current location of the second robot, P3 denotes two-dimensional coordinates for a current location of the third robot, P4 denotes two-dimensional coordinates for a current location of the fourth robot, P5 denotes two-dimensional coordinates for a current location of the fifth robot, P6 denotes two-dimensional coordinates for a current location of the sixth robot, P7 denotes two-dimensional coordinates for a current location of the seventh robot, P8 denotes two-dimensional coordinates for a current location of the eighth robot, P9 denotes two-dimensional coordinates for a current location of the ninth robot, P10 denotes two-dimensional coordinates for a current location of the tenth robot, P11 denotes two-dimensional coordinates for a current location of the eleventh robot, P12 denotes two-dimensional coordinates for a current location of the twelfth robot, P13 denotes two-dimensional coordinates for a current location of the thirteenth robot, P14 denotes two-dimensional coordinates for a current location of the fourteenth robot, and P15 denotes two-dimensional coordinates for a current location of the fifteenth robot.

It should be noted that reference numerals P1 to P15 to be described later may be used to indicate the coordinates of the respective robots and at the same time the corresponding robots themselves. For example, reference numeral P1 indicates the coordinates of the first robot, and reference numeral P1 also may be used to indicate the first robot (e.g., the first robot P1).

The area designation unit 100 may designate respective assigned areas (e.g., first to fifteenth assigned areas) for the first to fifteenth robots P1 to P15 based on the coordinates P1 to P15 of the first to fifteenth robots P1 to P15 (e.g., the current locations of the first to fifteenth robots). For example, the area designation unit 100 may designate the first to fifteenth assigned areas for the first to fifteenth robots by using a Voronoi diagram, based on the current locations of the first to fifteenth robots P1 to P15, as exemplified in FIG. 4.

Figure 4:
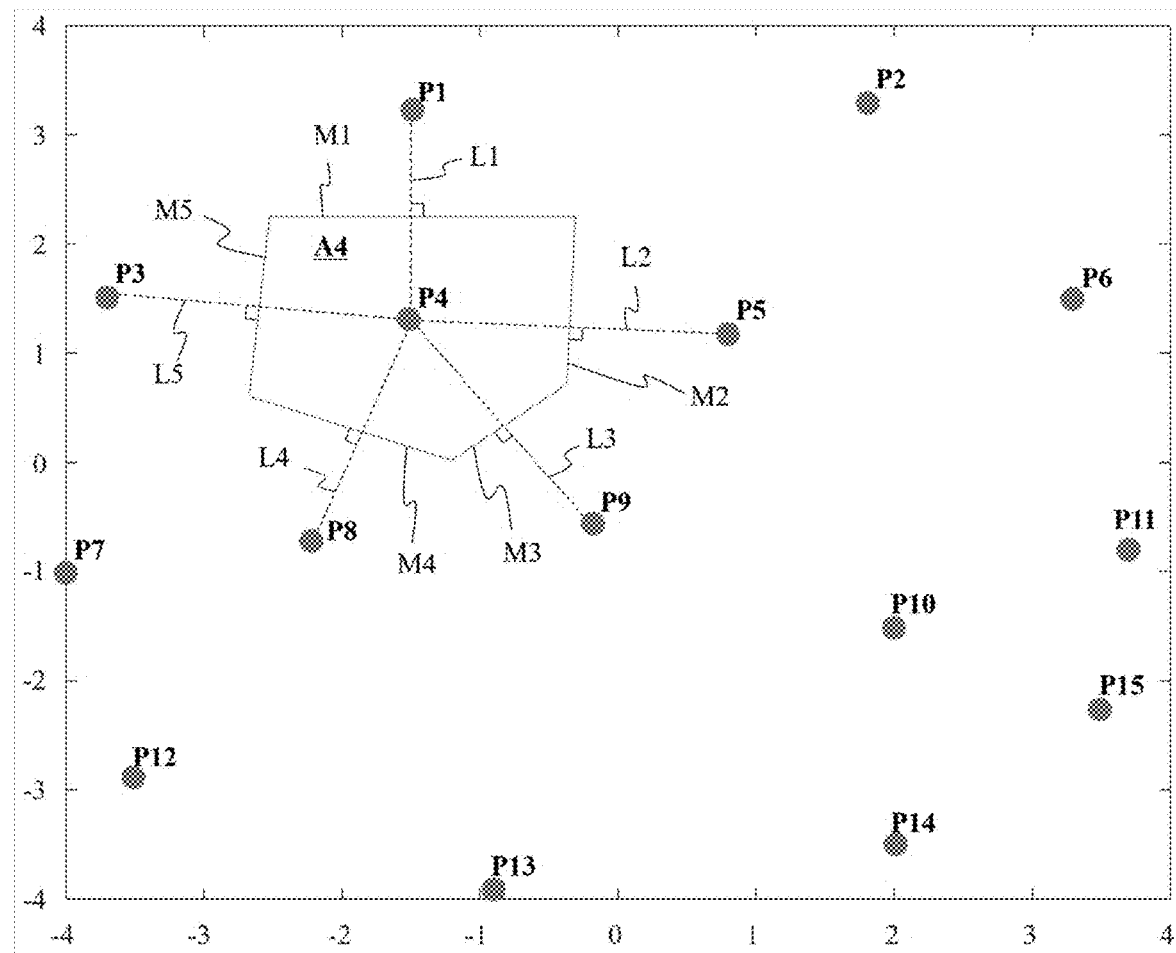

For example, the area designation unit 100 may divide the plane into cells, one for each point, by drawing perpendicular bisectors to the lines between every pair of points (e.g., two nearest points in the coordinate plane) corresponding to two nearest robots. For example, as illustrated in FIG. 4, a line segment joining the coordinates P4 of the fourth robot P4 and the coordinates P1 of the first robot P1, which are nearest neighbors, is defined as a first segment L1, a line segment joining the coordinates P4 of the fourth robot P4 and the coordinates P5 of the fifth robot P5, which are nearest neighbors, is defined as a second segment L2, a line segment joining the coordinates P4 of the fourth robot P4 and the coordinates P9 of the ninth robot P9, which are nearest neighbors, is defined as a third segment L3, a line segment joining the coordinates P4 of the fourth robot P4 and the coordinates P8 of the eighth robot P8, which are nearest neighbors, is defined as a fourth segment L4, and a line segment joining the coordinates P4 of the fourth robot P4 and the coordinates P3 of the third robot P3, which are nearest neighbors, is defined as a fifth segment L5. In this case, the region enclosed and defined by a first perpendicular bisector M1 of the first line segment L1, a second perpendicular bisector M2 of the second line segment L2, a third perpendicular bisector M3 of the third line segment L3, a fourth perpendicular bisector M4 of the fourth line segment L4, and a fifth perpendicular bisector M5 of the fifth line segment L5 may be designated as one Voronoi cell. In other words, one Voronoi cell defined by the first to fourth perpendicular bisectors M1 to M4 corresponds to the area (e.g., fourth assigned area A4) assigned to the fourth robot P4.

Figure 5:
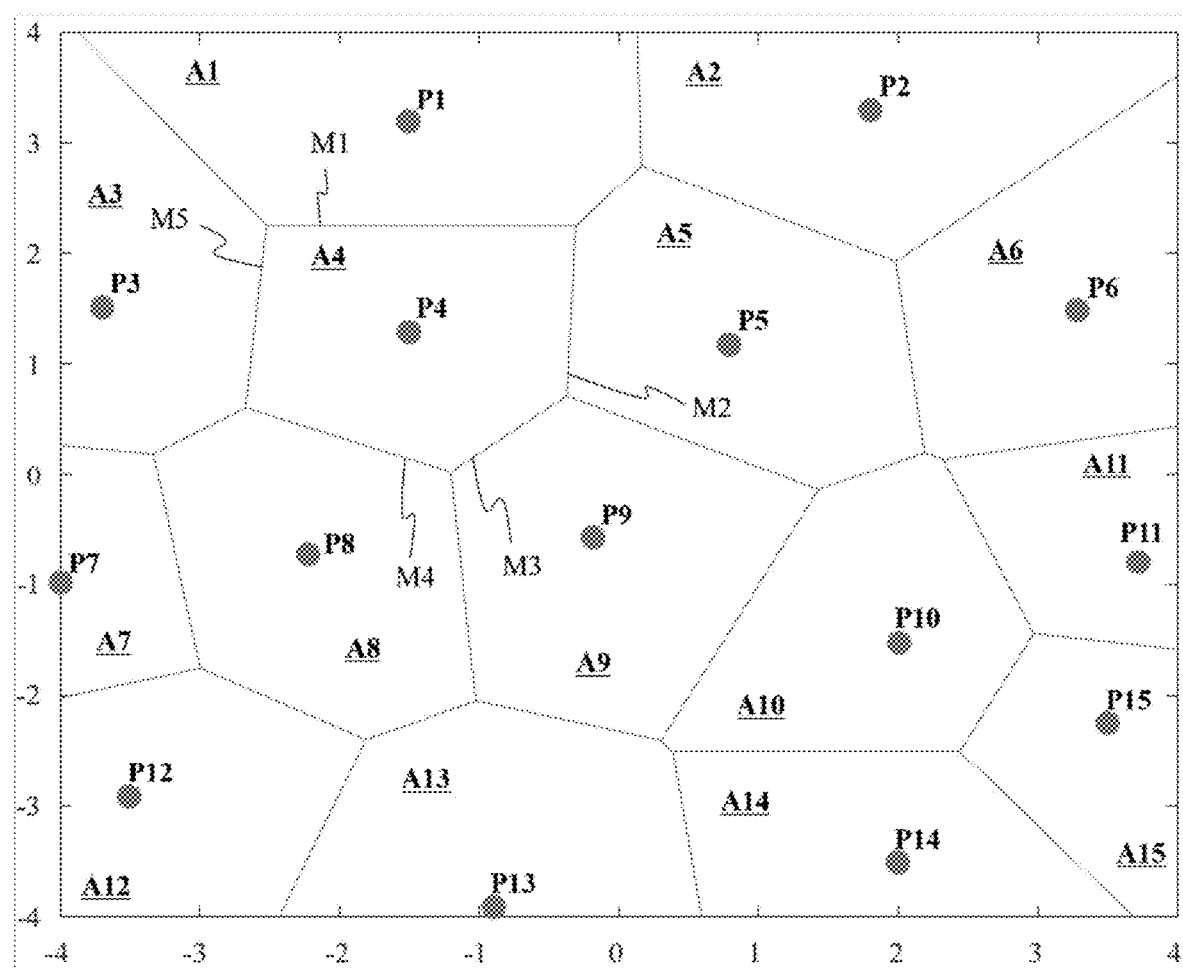

In this manner, as exemplified in FIG. 5, fifteen assigned areas (e.g., first to fifteenth assigned areas A1 to A15) may be designated. Only one robot may be disposed in each area. For example, the first to fifteenth robots P1 to P15 may be disposed in the first to fifteenth assigned areas A1 to A15, respectively.

Figure 6:
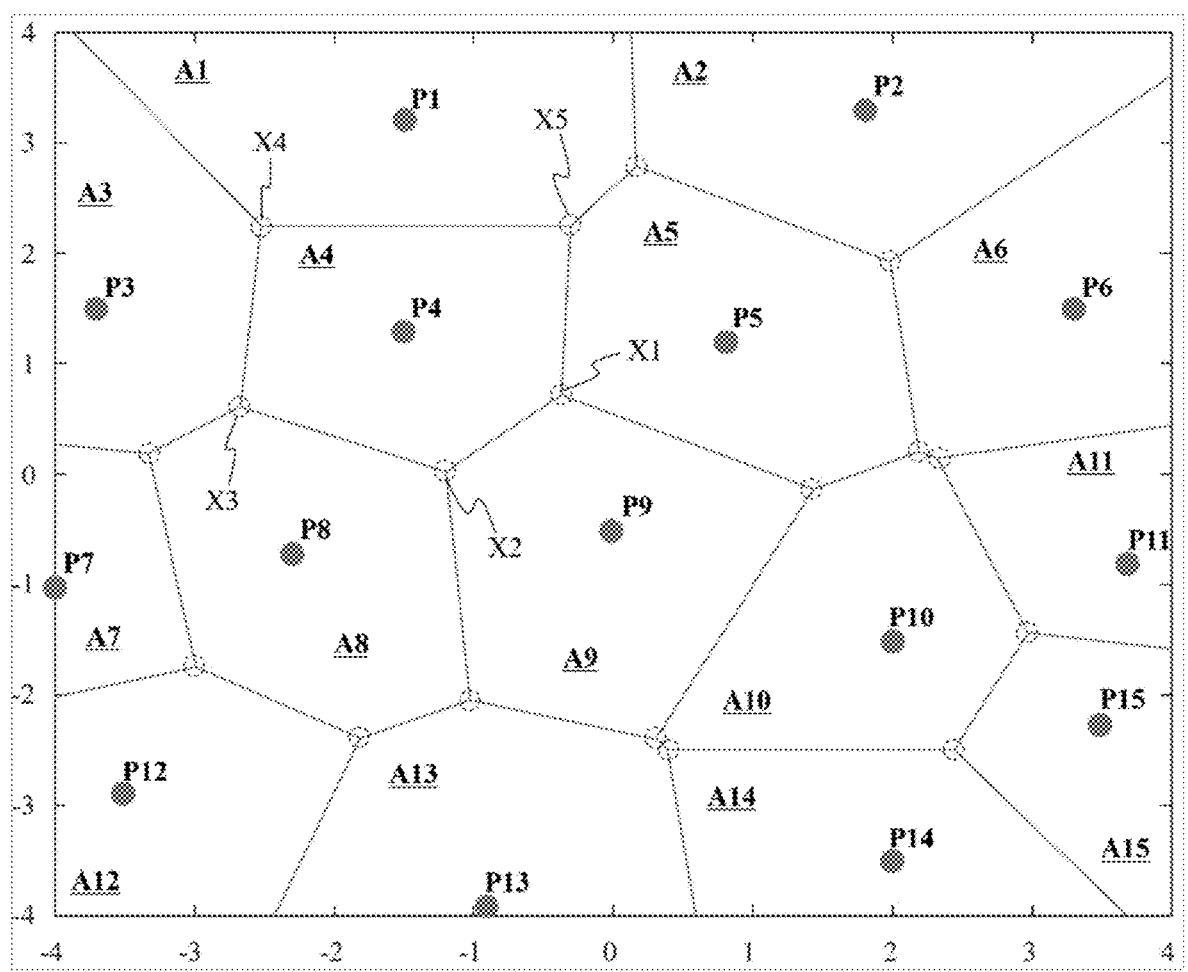

Each assigned area defined using a Voronoi diagram may form a polygon including at least three vertices. For example, as illustrated in FIG. 6, the fourth assigned area A4 where the fourth robot P4 is located may have a pentagonal shape including five vertices X1, X2, X3, X4, and X5.

In one embodiment, adjacent assigned areas may share vertices and sides (e.g., perpendicular bisectors). For example, as illustrated in FIG. 6, the first assigned area A1, the fifth assigned area A5, the ninth assigned area A9, eighth assigned area A8, and third assigned area A3, which are contiguous to the fourth assigned area A4, may share some vertices and some sides with the fourth assigned area A4.

In one embodiment, the moving points of a corresponding robot in each assigned area may be defined as the vertices of that assigned area. For example, the moving points X1, X2, X3, X4, and X5 may include the five vertices of the fourth assigned area A4. In other words, the first moving point X1, second moving point X2, third moving point X3, fourth moving point X4, and fifth moving point X5 of the fourth assigned area A5 may correspond to the first vertex, second vertex, third vertex, fourth vertex, and fifth vertex of the fourth assigned area A4. However, the moving points of each assigned area are not limited thereto, but may be defined by, for example, the midpoints of boundary lines of each assigned area. For example, the first to fifth moving points of the fourth assigned area A4 may correspond to the midpoints of five sides (e.g., first to fifth sides) of the fourth assigned area A4. In other words, the fourth assigned area A4 includes the first to fifth perpendicular bisectors M1 to M5 corresponding to the first to fifth sides, as described above. In this case, the midpoint of the first perpendicular bisector M1, the midpoint of the second perpendicular bisector M2, the midpoint of the third perpendicular bisector M3, the midpoint of the fourth perpendicular bisector M4, and the midpoint of the fifth perpendicular bisector M5 may be designated as the first moving point, second moving point, third moving point, fourth moving point, and fifth moving point of the fourth assigned area A4.

Figure 7:
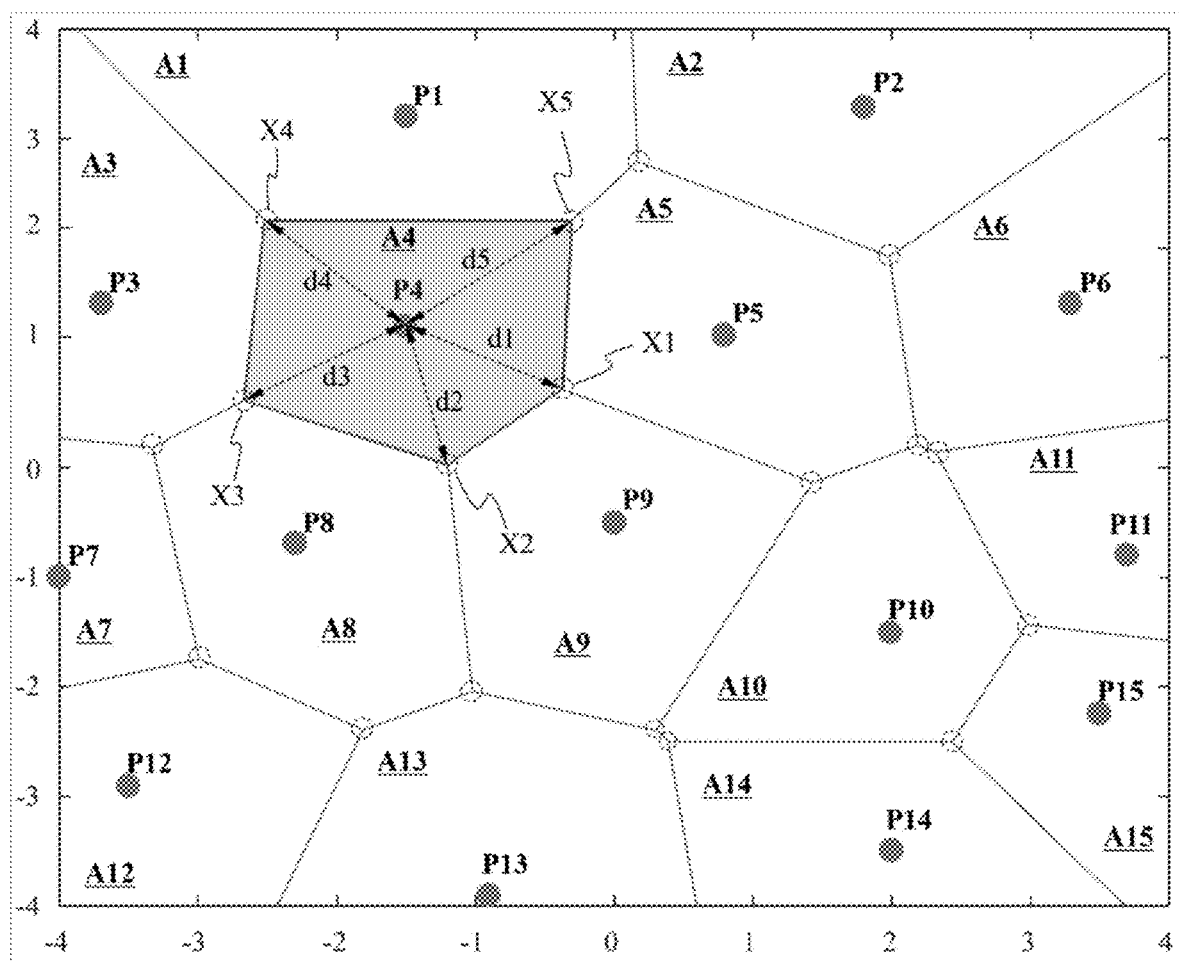
Figure 8:
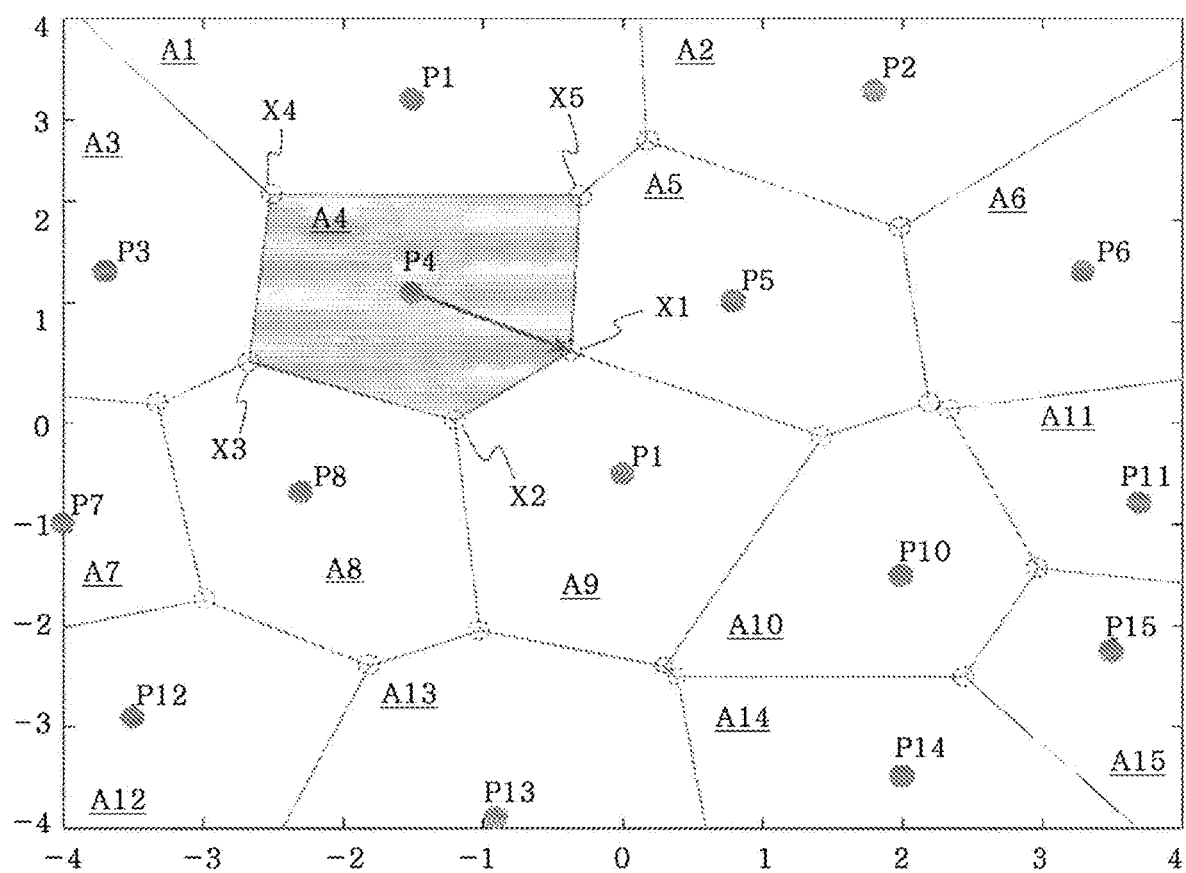

Referring to FIGS. 7 and 8, an operation in which the candidate point selection unit 210 and the start point determination unit 220 select the start moving point for the fourth robot P4 will be described below.

As in an example illustrated in FIG. 7, the candidate point selection unit 210 may calculate the distances between the fourth robot P4 disposed in the fifth assigned area A5 and the moving points of the fourth assigned area A4. For example, the distance d1 between the fourth robot P4 and the first moving point X1 of the fourth assigned area A4, the distance d2 between the fourth robot P4 and the second moving point X2 of the fourth assigned area A4, the distance d3 between the fourth robot P4 and the third moving point X3 of the fourth assigned area A4, the distance d4 between the fourth robot P4 and the fourth moving point X4 of the fourth assigned area A4, and the distance d5 between the fourth robot P4 and the fifth moving point X5 of the fourth assigned area A4 may be calculated. Here, as illustrated in FIG. 7, if d1 is the smallest of all the calculated distances d1, d2, d3, d4, and d5, the candidate point selection unit 210 may select the first moving point X1 positioned at the distance d1 from the fourth robot P4 as a candidate moving point.

Afterwards, if the fourth robot P4 moves to the first moving point X1 of the fourth assigned area A4, the start point determination unit 220 determines whether the fourth robot P4 spatially (and/or temporally) overlaps at least one other robot at the first moving point X1. As illustrated in FIG. 8, upon determining that the fourth robot P4 does not overlap another robot at the first moving point X1 of the fourth assigned area A4, the start point determination unit 220 may determine the first moving point X1 selected as the candidate to be the start moving point for the fourth robot P4. In other words, upon determining that the start moving point for the fourth robot P4 and the start moving point for another robot are not the same, the start point determination unit 220 may then designate the first moving point X1 as the start moving point for the fourth robot P4.

Subsequently, referring to FIGS. 9 to 12, an operation in which the candidate point selection unit 210 and the start point determination unit 220 select the start moving point for the fifth robot P5 will be described below.

Figure 9:
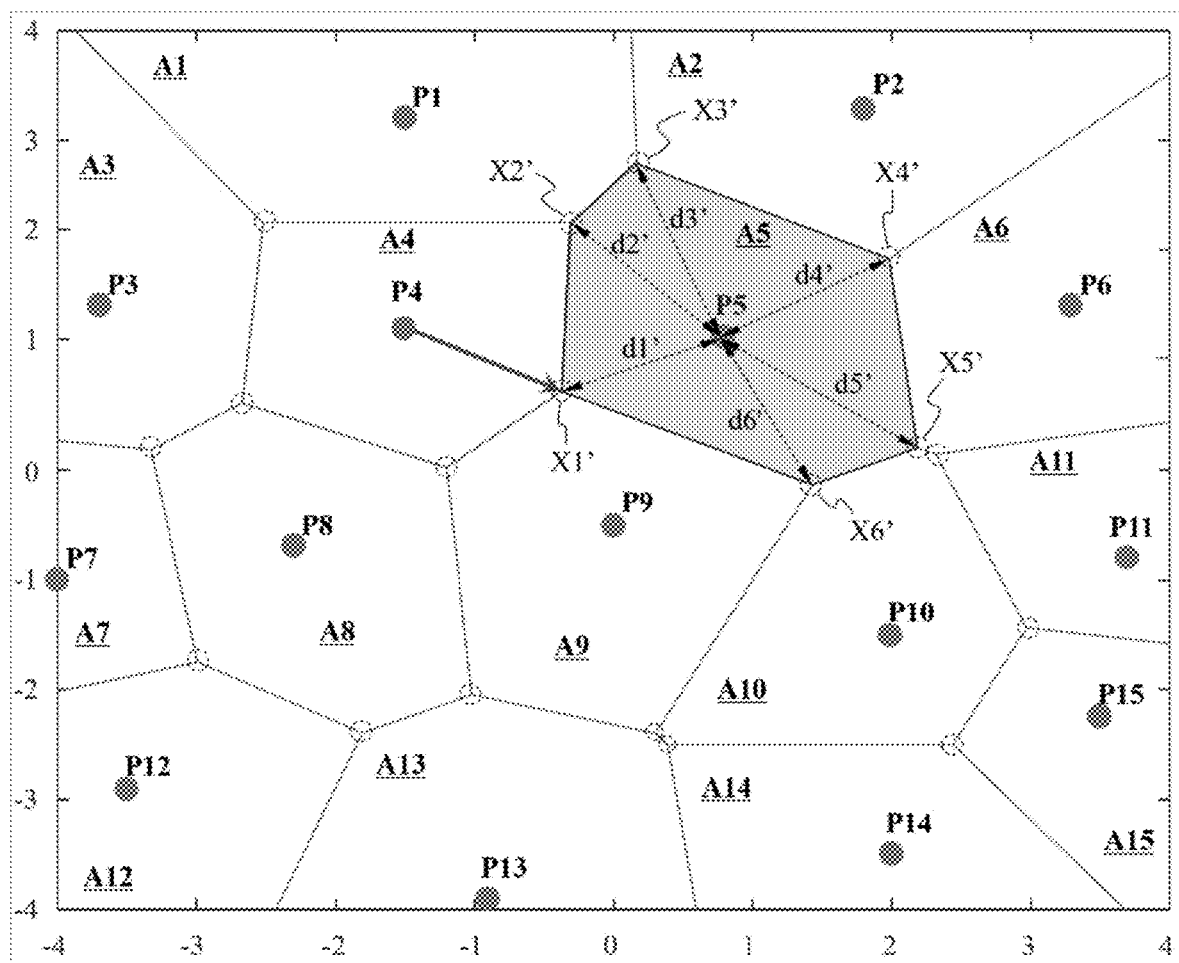

First, as illustrated in FIG. 9, the candidate point selection unit 210 may calculate the distances between the fifth robot P5 disposed in the fifth assigned area A5 and the moving points of the fifth assigned area A5. For example, the distance d1' between the fifth robot P5 and the first moving point X1' of the fifth assigned area A5, the distance d2' between the fifth robot P5 and the second moving point X2' of the fifth assigned area A5, the distance d3' between the fifth robot P5 and the third moving point X3' of the fifth assigned area A5, the distance d4' between the fifth robot P5 and the fourth moving point X4' of the fifth assigned area A5, the distance d5' between the fifth robot P5 and the fifth moving point X5' of the fifth assigned area A5, and the distance d6' between the fifth robot P5 and the sixth moving point X6' of the fifth assigned area A5 may be calculated. Here, as illustrated in FIG. 9, if d1' is the smallest of all the calculated distances d1', d2', d3', d4', d5', and d6', the candidate point selection unit 210 may select the first moving point X1' positioned at the distance d1' from the fifth robot P5 as a candidate moving point.

Figure 10:
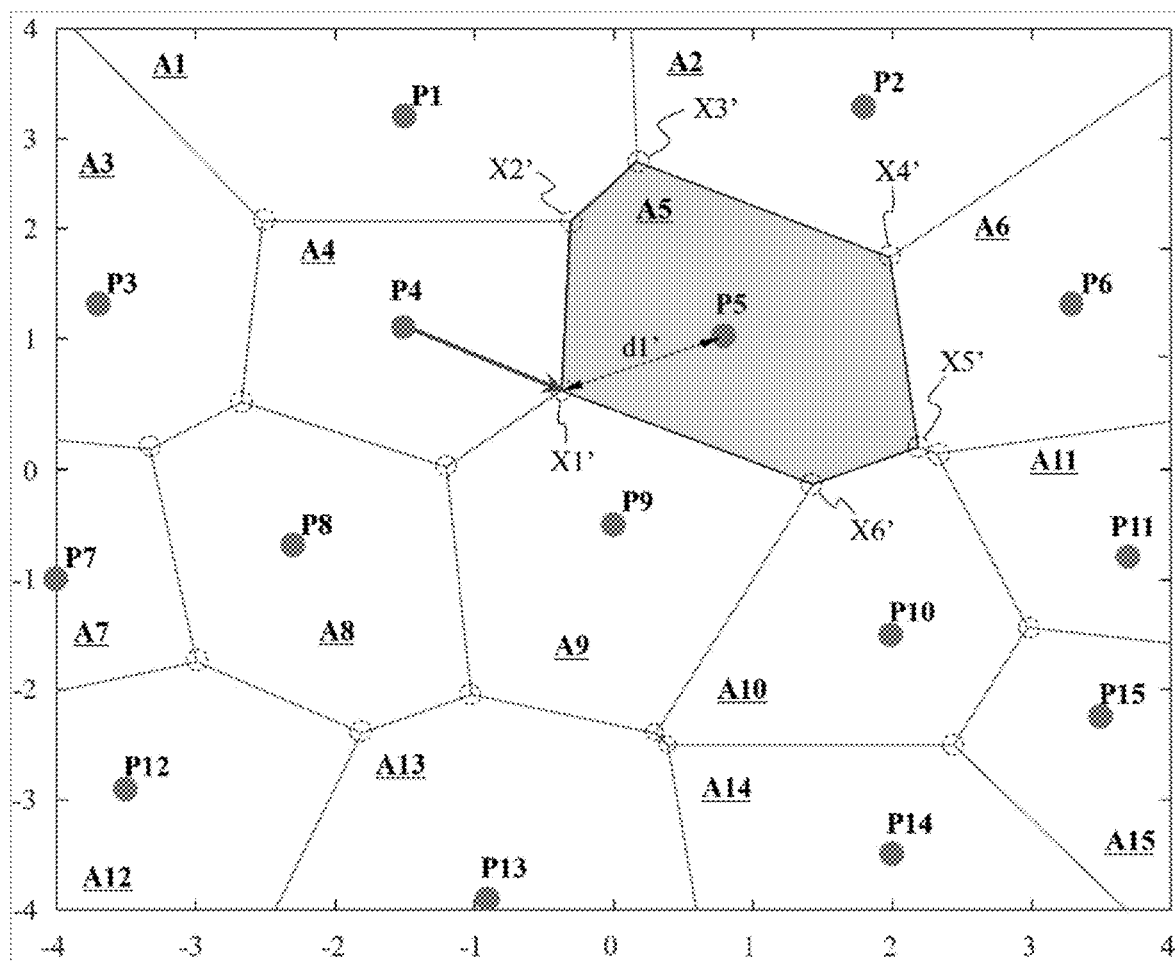

Afterwards, if the fifth robot P5 moves to the first moving point X1' of the fifth assigned area A5, the start point determination unit 220 determines whether the fifth robot P5 spatially (and/or temporally) overlaps at least one other robot at the first moving point X1'. As illustrated in FIG. 10, the fifth robot P5 and the above-described fourth robot P4 overlap at the first moving point X1'. That is, the first moving point X1' of the fifth assigned area A5 is the same as the first moving point X1 of the fourth assigned area A4. Thus, the start point determination unit 220 determines the candidate moving point (e.g., the first moving point X1' of the fifth assigned area A5) not to be the start moving point for the fifth robot P5. Instead, the start point determination unit 220 sends a reselection signal to the candidate point selection unit 210.

Figure 11:
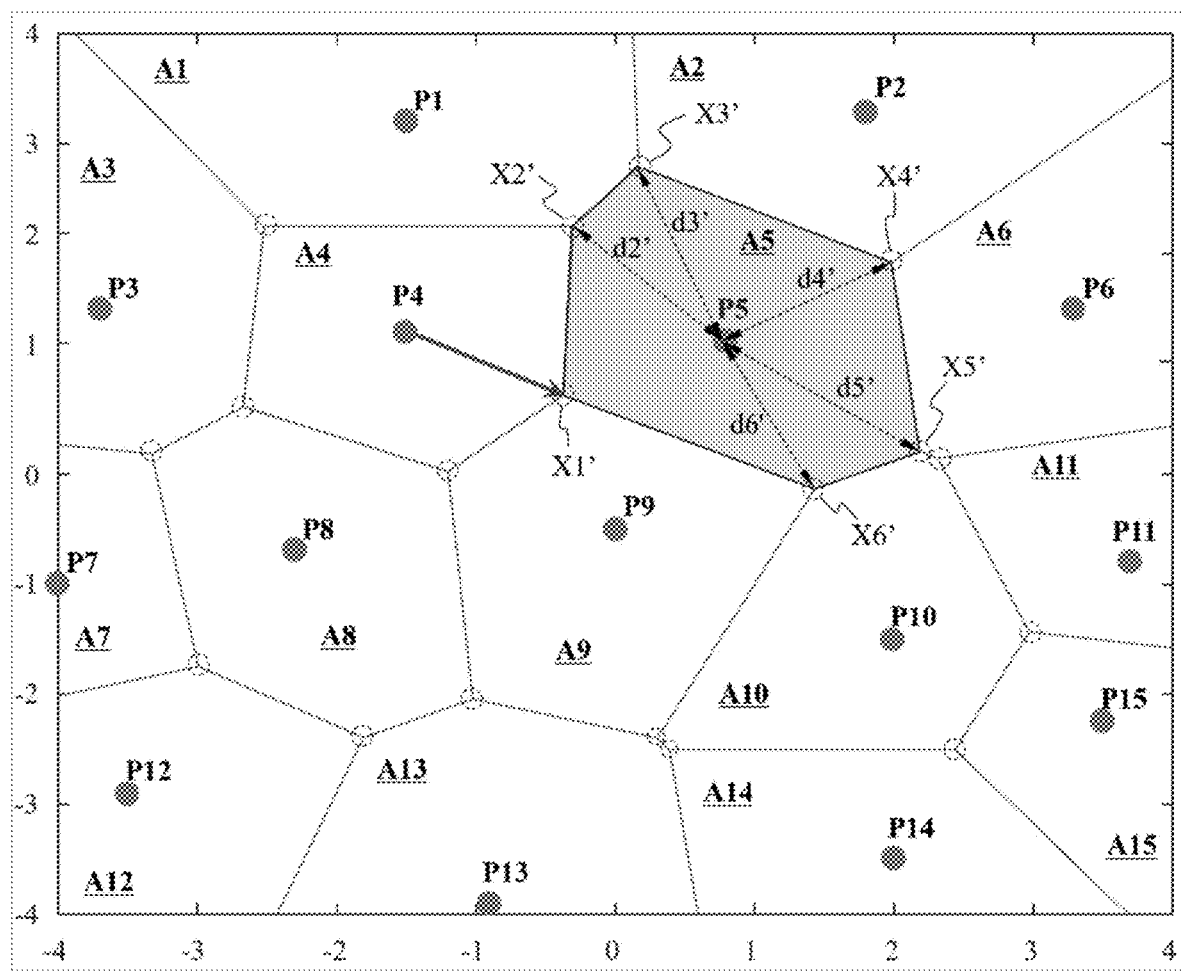

Then, in response to the above reselection signal, the candidate point selection unit 210 may calculate the distances between the fifth robot P5 and the second to sixth moving points X2' to X6', as illustrated in FIG. 11, but not the distance between the fifth robot P5 and the first moving point X1' of the fifth assigned area A5. Meanwhile, if the candidate point selection unit 210 has already saved the above calculated values (e.g., distances) d1', d2', d3', d4', d5', and d6', the above calculation may not be required. Here, as illustrated in FIG. 11, if d4' is the smallest of all the calculated distances d2', d3', d4', d5', and d6', the candidate point selection unit 210 may select the fourth moving point X4' positioned at the distance d4' from the fifth robot P5 as a second candidate moving point.

Figure 12:
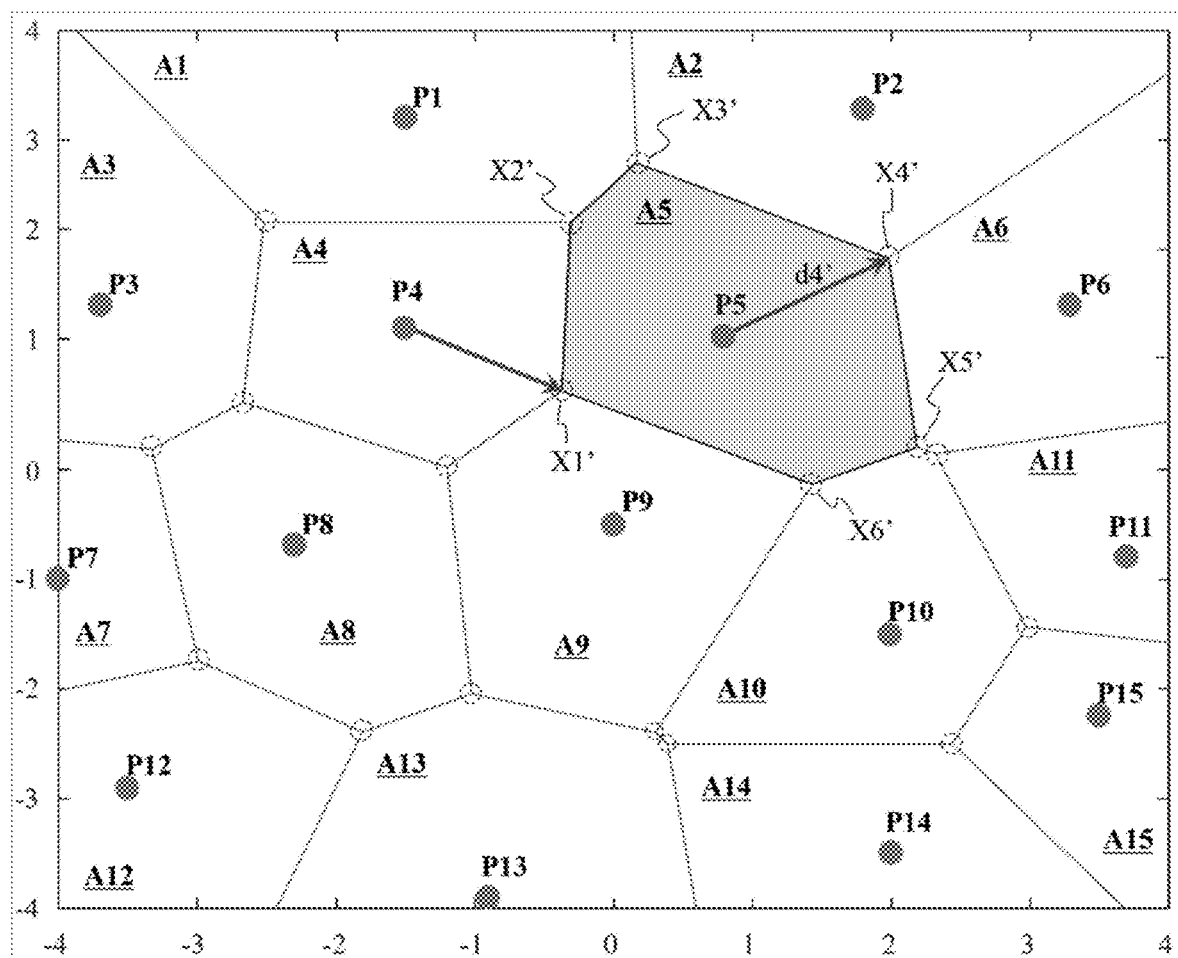

Afterwards, if the fifth robot P5 moves to the fourth moving point X4' of the fifth assigned area A5, the start point determination unit 220 determines whether the fifth robot P5 spatially (and/or temporally) overlaps at least one other robot at the fourth moving point X4'. As illustrated in FIG. 12, upon determining that the fifth robot P5 does not overlap another robot at the fourth moving point X4', the start point determination unit 220 may determine the fourth moving point X4' selected as the second candidate to be the start moving point for the fifth robot P5. In other words, upon determining that the start moving point for the fifth robot P5 and the start moving point for another robot are not the same, the start point determination unit 220 may then designate the fourth moving point X4' as the start moving point for the fifth robot P5.

Figure 14:
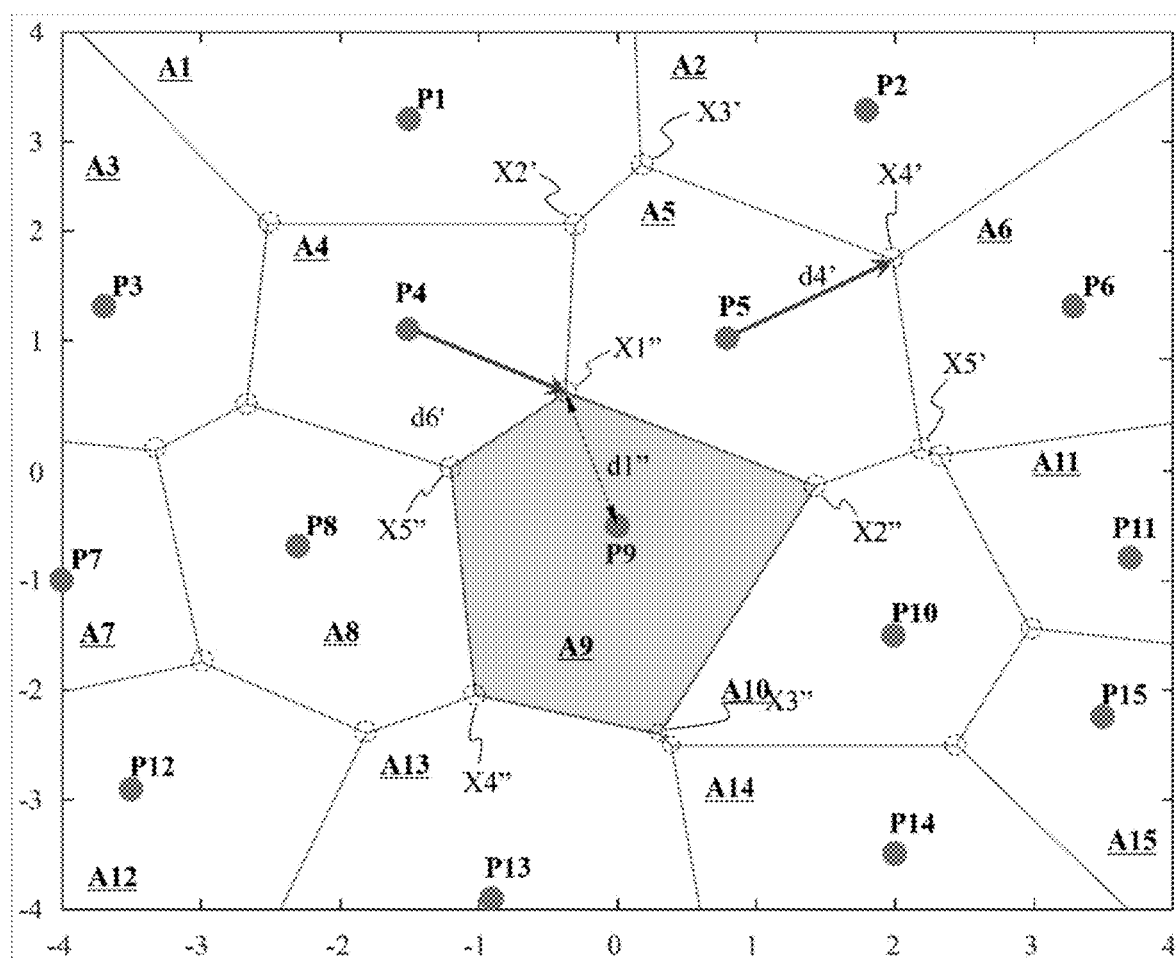
Figure 15:
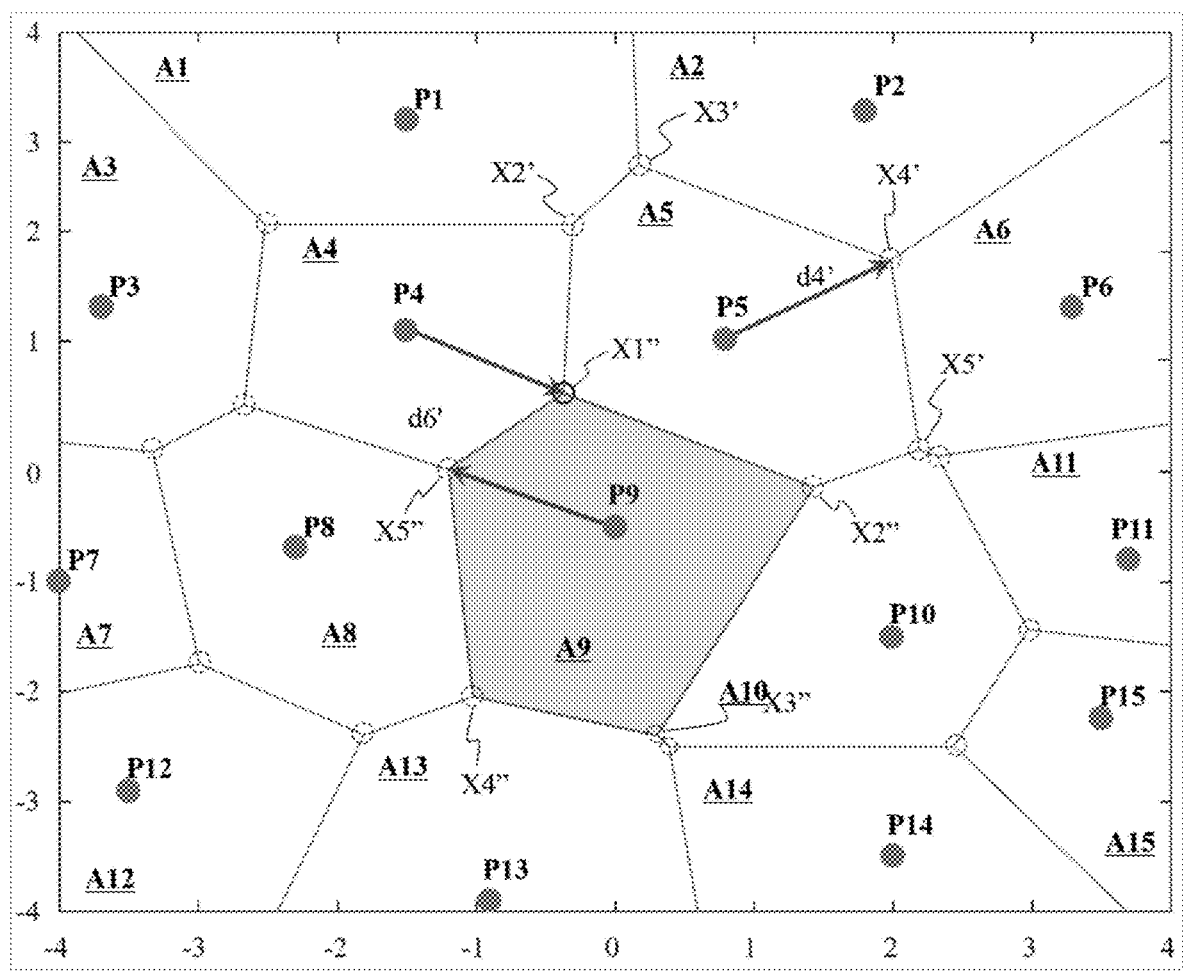

Subsequently, referring to FIGS. 13 to 15, an operation in which the candidate point selection unit 210 and the start point determination unit 220 select the start moving point for the ninth robot P9 will be described below.

Figure 13:
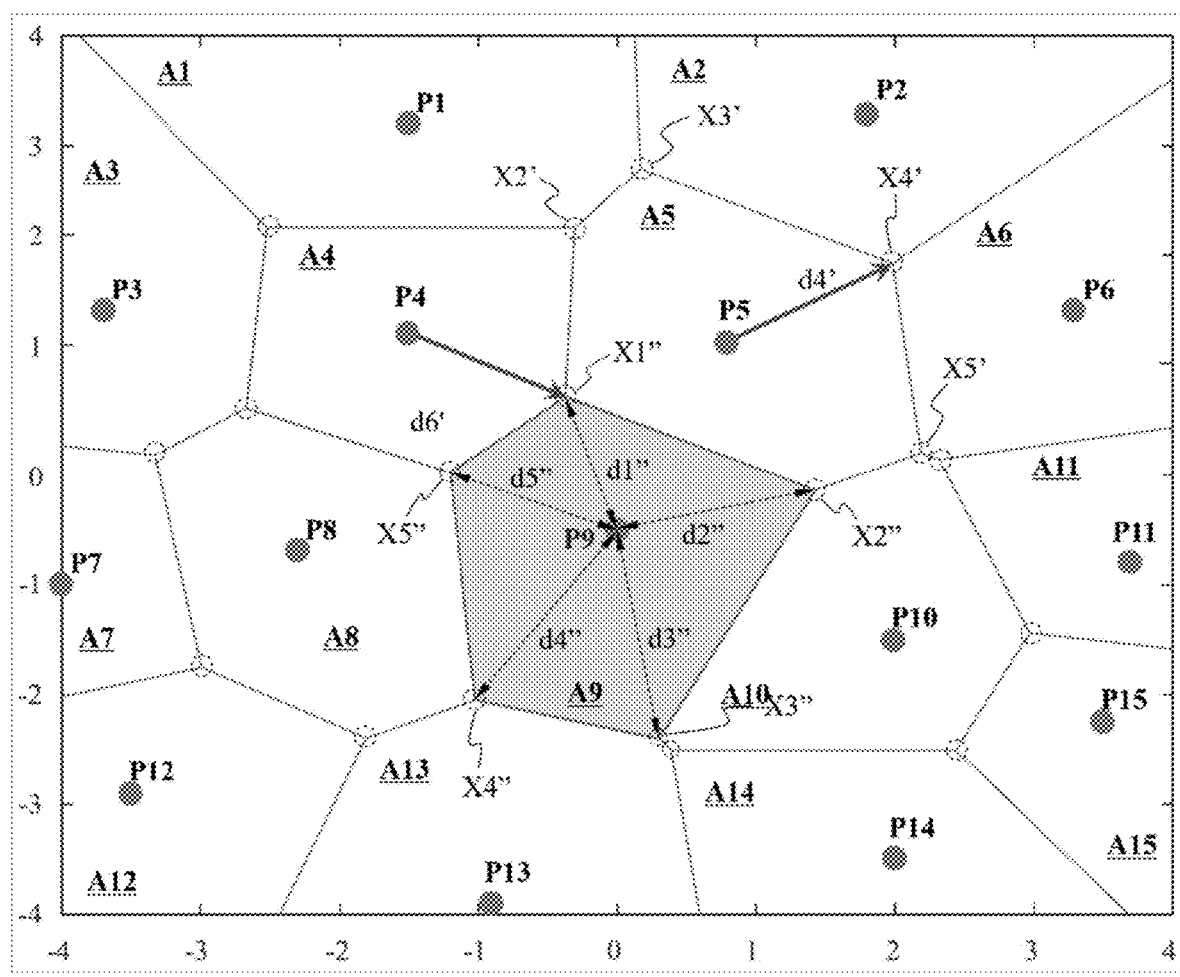

First, as illustrated in FIG. 13, the candidate point selection unit 210 may calculate the distances d1", d2", d3", d4", and d5" between the ninth robot P9 disposed in the ninth assigned area A9 and the moving points X1", X2", X3", X4", and X5" of the ninth assigned area A9. Here, as illustrated in FIG. 13, if d1" is the smallest of all the calculated distances d1", d2", d3", d4", and d5", the candidate point selection unit 210 may select the first moving point X1" positioned at the distance d1" from the ninth robot P9 as a candidate moving point.

Afterwards, if the ninth robot P9 moves to the first moving point X1" of the ninth assigned area A9, the start point determination unit 220 determines whether the ninth robot P9 spatially (and/or temporally) overlaps at least one other robot at the first moving point X1". As illustrated in FIG. 14, the ninth robot P9 and the above-described fourth robot P4 overlap at the first moving point X1" of the ninth assigned area A9. That is, the first moving point X1" of the ninth assigned area A9 is the same as the first moving point X1 of the fourth assigned area A4. Thus, the start point determination unit 220 sends a reselection signal to the candidate point selection unit 210.

Then, in response to the above reselection signal, the candidate point selection unit 210 may calculate the distances d2" to d5" between the ninth robot P9 and the second to fifth moving points X2" to X5", but not the distance d1" between the ninth robot P9 and the first moving point X1" of the ninth assigned area A9. Here, if d5" is the smallest of all the calculated distances d2", d3", d4", and d5", the candidate point selection unit 210 may select the fourth moving point X5" positioned at the distance d5" from the ninth robot P9 as a second candidate moving point.

Afterwards, if the ninth robot P5 moves to the fifth moving point X5" of the ninth assigned area A9, the start point determination unit 220 determines whether the ninth robot P9 spatially (and/or temporally) overlaps at least one other robot at the fifth moving point X5". As illustrated in FIG. 15, upon determining that the ninth robot P9 does not overlap another robot at the fifth moving point X5", the start point determination unit 220 may determine the fifth moving point X5" selected as the second candidate to be the start moving point for the ninth robot P9.

Although not shown, if the ninth robot P9 overlaps another robot at the second candidate moving point too, a third candidate moving point may be selected from among the other moving points X2", X3", and X4", excluding the fifth moving point X5" corresponding to the second candidate moving point and the previous first moving point X1". That is, all of the previous moving points which are deemed inappropriate are excluded when selecting a new candidate moving point.

Figure 16:
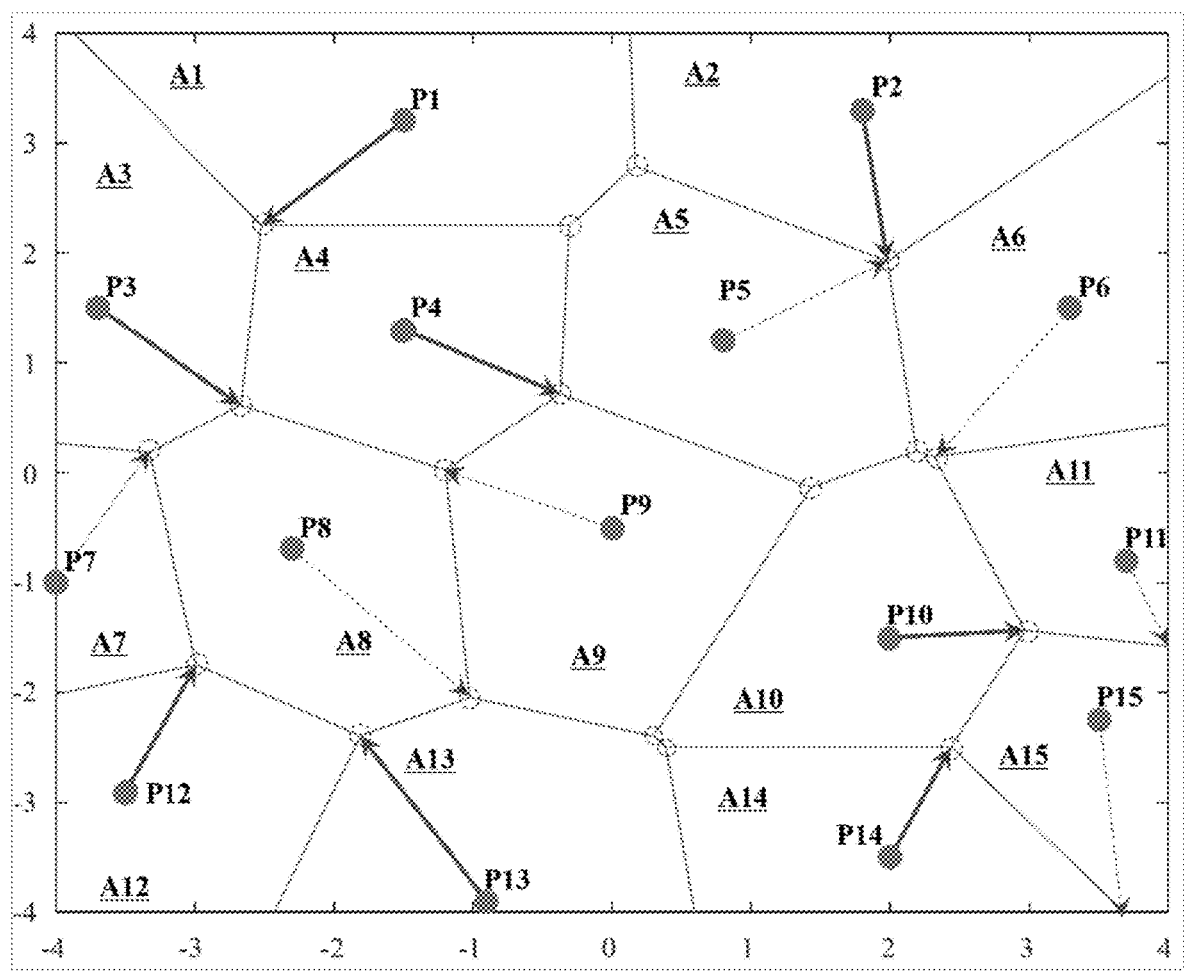

By sequentially determining the start moving points for every robot in this manner, the start moving points (e.g., start moving points where two or more robots do not spatially and/or temporally overlap) for all of the robots P1 to P15 forming a swarm may be selected and determined, as in an example illustrated in FIG. 16. In this case, the calculation of the start moving points for the first to fifteenth robots P1 to P15 may be done in the order of first, second, third, . . . , fourteenth, and fifteenth robots, or in a preset order or in a random order. For example, as illustrated in FIGS. 7 to 15, the start moving points may be selected in the order of the fourth robot P4, the fifth robot P5, and the ninth robot P9.

In FIG. 16, arrows extended from each robot represent paths along which the robots move to their start moving points. For example, the arrow extended from the first robot P1 represents the start moving point for the first robot P1 (e.g., the first moving point X1 of the first assigned area A1). In this case, an arrow with a solid line indicates a first candidate moving point selected as a start moving point, and an arrow with a dotted line indicates second to subsequent candidate moving points selected as a start moving point. For example, as illustrated in FIG. 16, the first robot P1, the second robot P2, the third robot P3, the fourth robot P4, the tenth robot P10, the twelfth robot P12, the thirteenth robot P13, and the fourteenth robot P14 are robots that are given the first candidate moving point as their start moving point, and the fifth robot P5, the sixth robot P6, the seventh robot P7, the eighth robot P8, the ninth robot P9, the eleventh robot P11, and the fifteenth robot P15 are robots that are given the second or third candidate moving point as their start moving point.

In one embodiment, as described above, once the start moving points for all of the robots forming a swarm (for example, the start moving points where two or more robots do not spatially and/or temporally overlap) have been selected and determined, the robot controller 300 moves each robot to the corresponding start moving point. In this case, the robot controller 300 may have all the robots start moving simultaneously. For example, the first to fifteenth robots P1 to P15 may simultaneously receive a movement command from the robot controller 300 and simultaneously start moving toward the corresponding start moving points.

Figure 17:
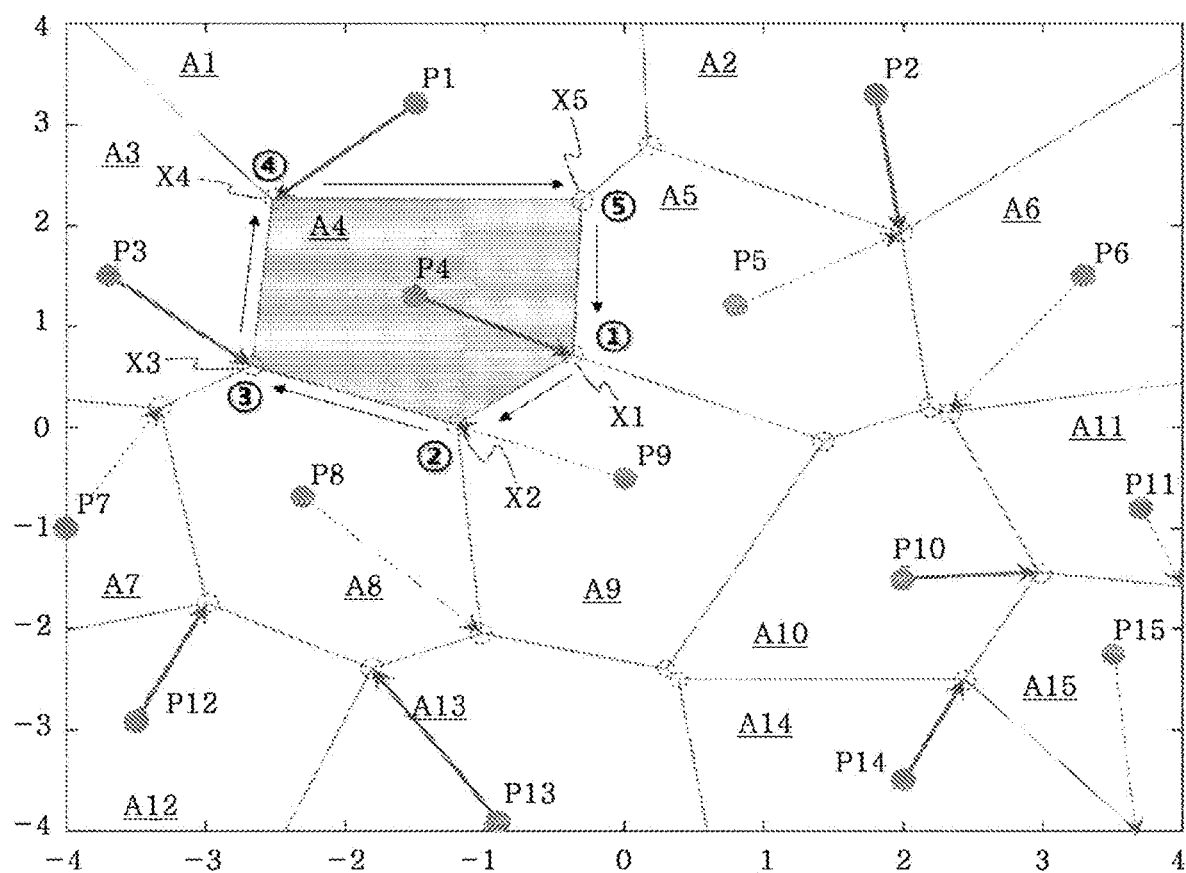
FIG. 17 is a view for explaining a circulation movement of robots.

FIG. 17 is a view for explaining a circulation movement of robots.

As described above, once the start moving points for all of the robots forming a swarm have been selected and determined, each robot may move to its corresponding start moving point.

Afterwards, the robot controller 300 may control a robot that has arrived at its start moving point to move along the boundary of the assigned area for the robot. For example, as illustrated in FIG. 17, the robot controller 300 may control the fourth robot P4 to circulate in a clockwise direction ①, ②, ③, ④, and ⑤ along the boundary of the fourth assigned area A4. That is, as exemplified in FIG. 17, the fourth robot P4 arrives at the first moving point X1 which is the start moving point, and then moves from the first moving point X1 through the second moving point X2, the third moving point X3, the fourth moving point X4, and the fifth moving point X5 in a clockwise direction. In this instance, after having arrived at the fifth moving point X5, the fourth robot P4 may move over again through the first moving point X1 in the clockwise direction. For example, the fourth robot P4 may continue to circulate clockwise along the boundary of the fourth assigned area A4. On the other hand, the fourth robot P4 may circulate along the boundary of the fourth assigned area A4 in a counterclockwise direction ①, ⑤, ④, ③, and ②, rather than in the above clockwise direction.

The other robots also may circulate along the boundary of the corresponding assigned area in a clockwise or counterclockwise direction in the same manner as the fourth robot P4.

Figure 18:
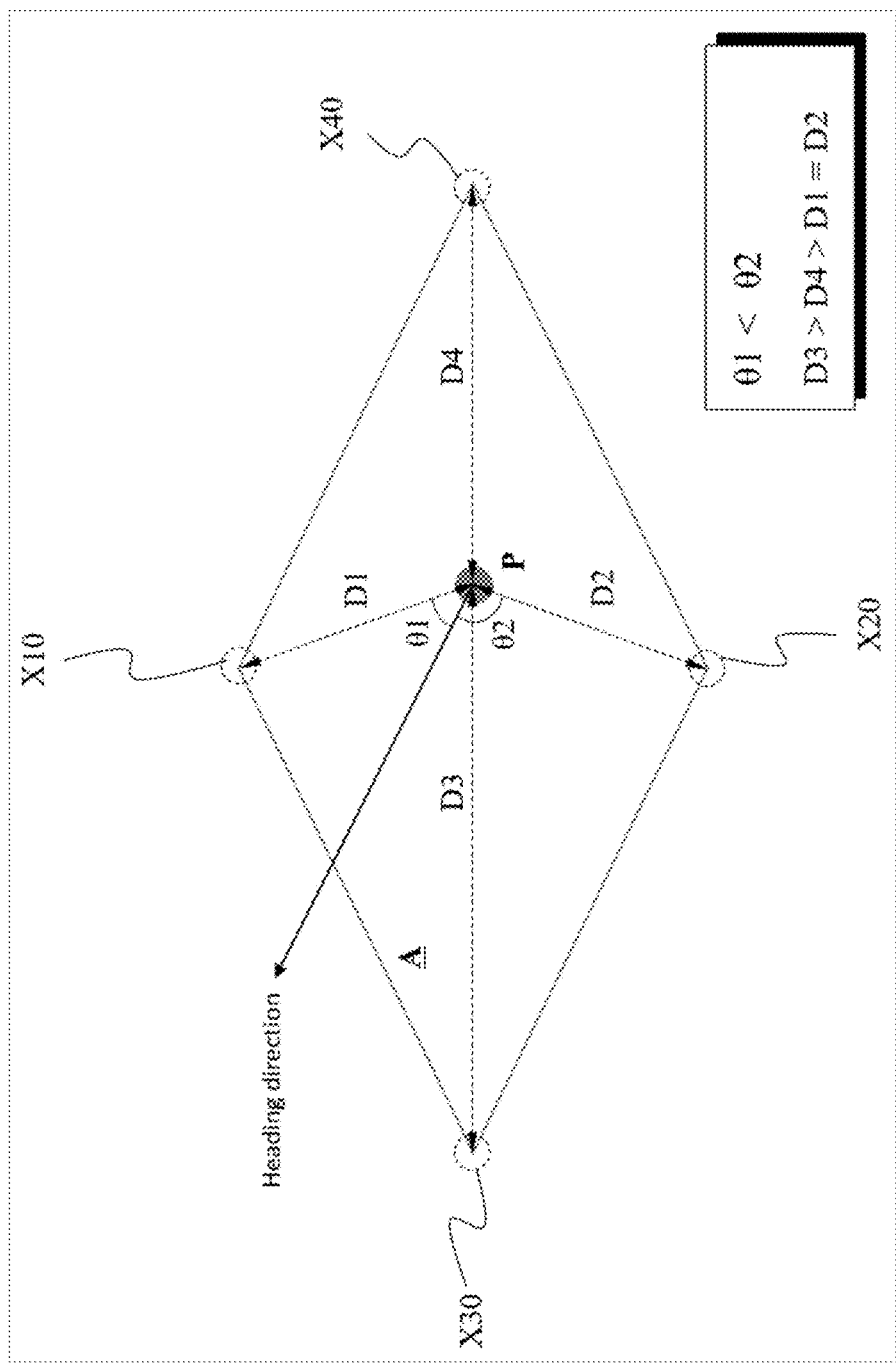
FIG. 18 is a view for explaining a method of selecting a candidate moving point when there are at least two nearest moving points to one robot.

FIG. 18 is a view for explaining a method of selecting a candidate moving point when there are at least two nearest moving points to one robot.

As illustrated in FIG. 18, there may be at least two nearest moving points to one robot P disposed in an assigned area. For example, the distance D1 from the robot P to a first moving point X10 of the assigned area A and the distance D2 from the robot P to a second moving point X20 of the assigned area A may be equal. On the other hand, the distance D3 from the robot P to a third moving point X30 of the assigned area A is greater than the distance D4 from the robot P to a fourth moving point X40 of the assigned area A, and the distance D4 is greater than the above distance D1. In this case, the candidate point selection unit 210 may compare angles between the first and second moving points X10 and X20 and the direction the robot P is heading in, and select one of the first and second moving points X10 and X20 as the candidate moving point based on a result of the comparison.

For example, the candidate point selection unit 210 may select a moving point whose angle to the direction the robot P is heading in is the smallest as the candidate moving point, from between the first and second moving points X10 and X20. In the example of FIG. 18, the angle θ1 between the direction the robot P is heading in and the first moving point X10 is smaller than the angle θ2 between the direction the robot P is heading in and the second moving point X20, and therefore the first moving point X10 is selected as a candidate moving point. Afterwards, the first moving point X10 selected as the candidate moving point may be determined to be the ultimate start moving point depending on a result of a determination about whether there is an overlap, as described above, or may be excluded as a candidate for the start moving point.

Here, the above direction the robot P is heading in is a direction a front portion of the robot P is facing, and the robot P may move forward in that heading direction when it has received a forward movement command without a steering instruction.

Figure 19:
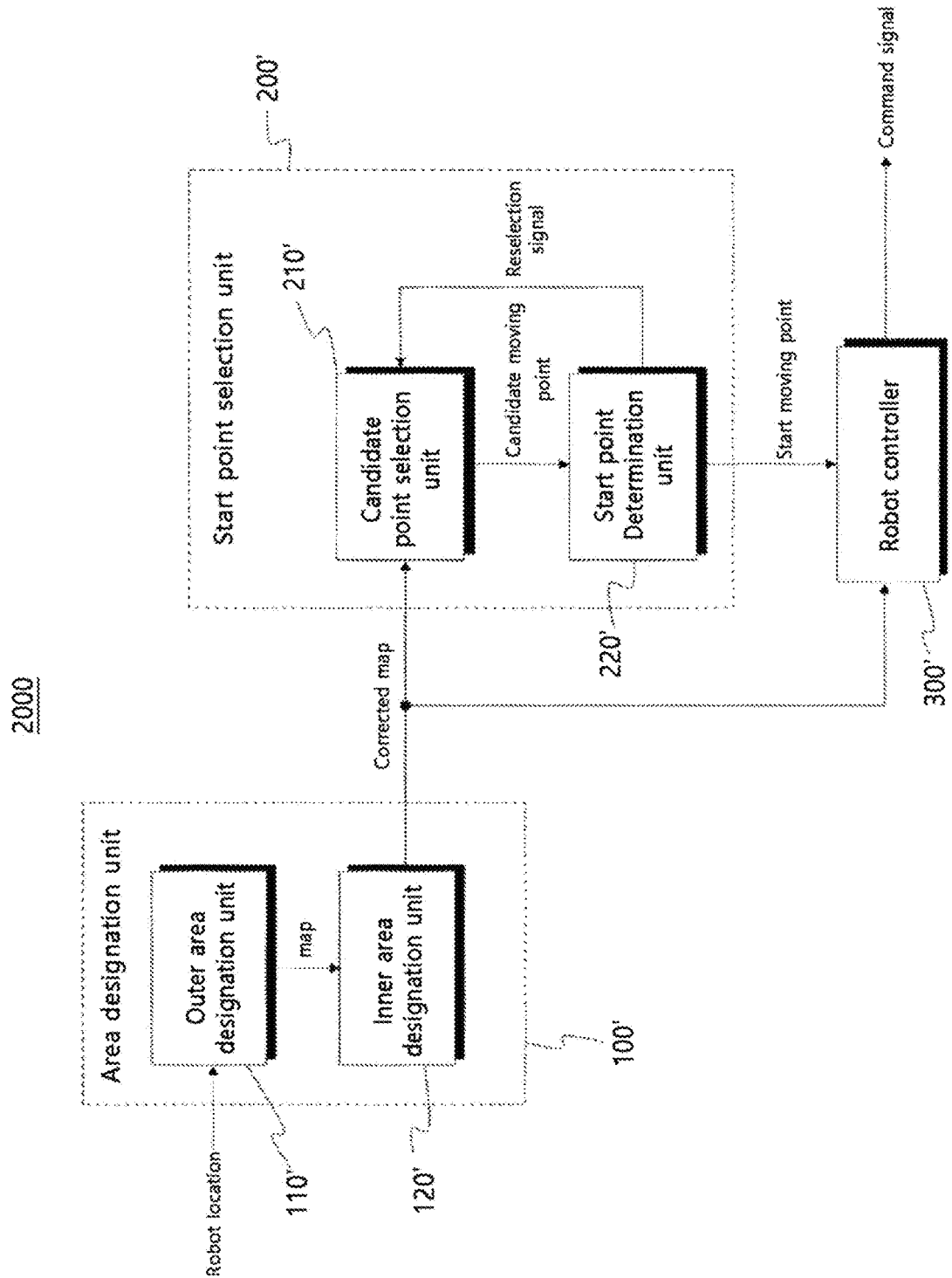
FIG. 19 is a block diagram of a swarm robot control apparatus according to another embodiment of the present disclosure.
Figure 20:
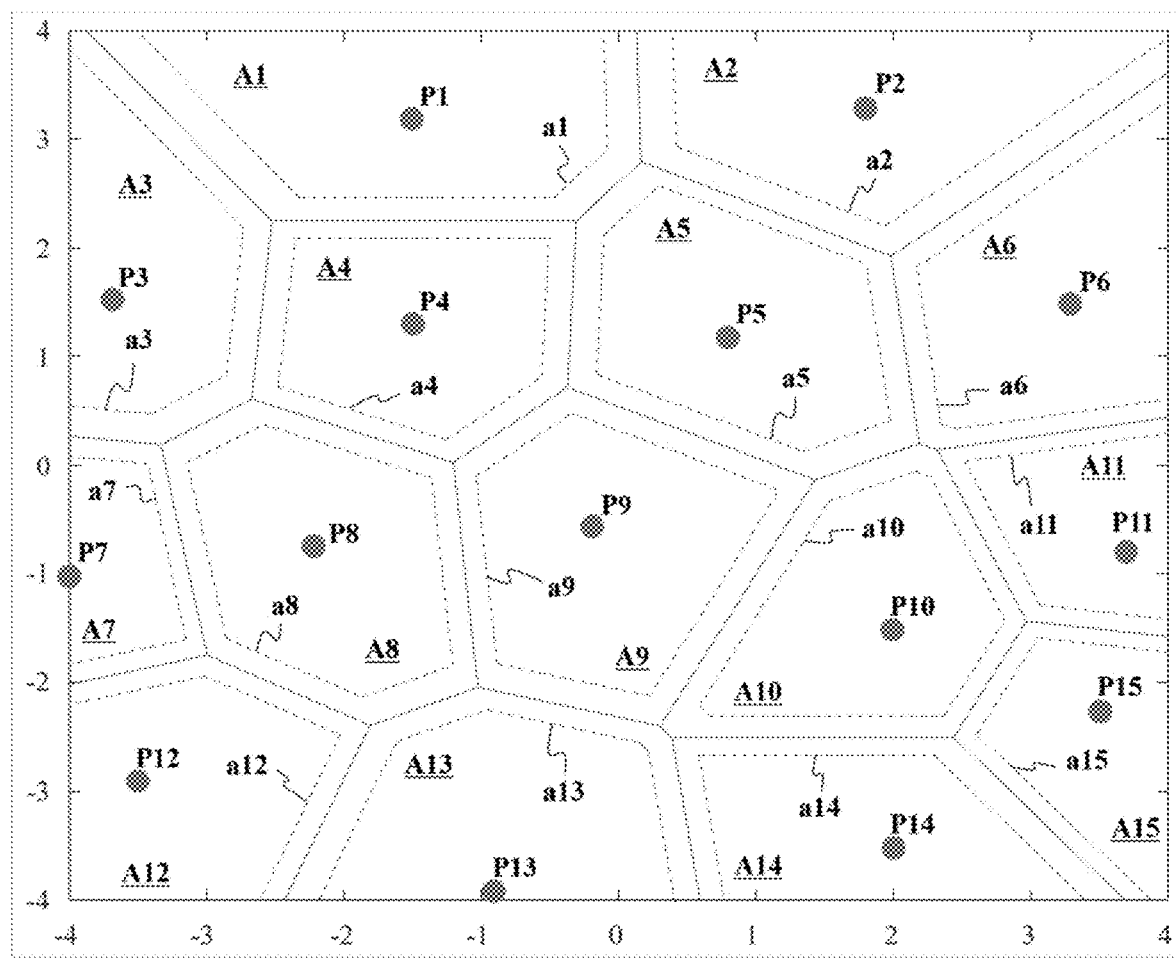
FIG. 20 is a view for explaining an outer assigned area and inner assigned area which are designated by the area designation unit of FIG. 19.
Figure 21:
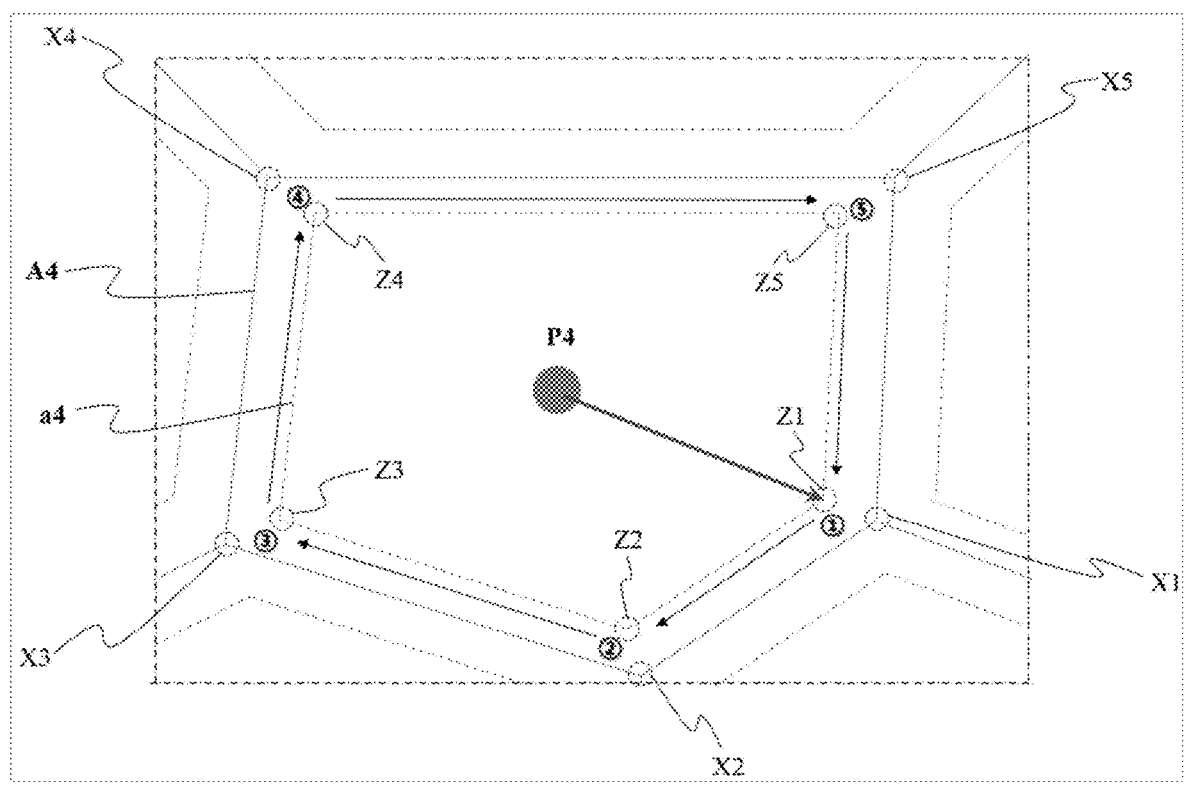
FIG. 21 is an enlarged view of a fourth outer assigned area and fourth inner assigned area of FIG. 20.

FIG. 19 is a block diagram of a swarm robot control apparatus 2000 according to another embodiment of the present disclosure. FIG. 20 is a view for explaining an outer assigned area and inner assigned area which are designate by the area designation unit 100' of FIG. 19. FIG. 21 is an enlarged view of a fourth outer assigned area A4 and fourth inner assigned area a4 of FIG. 20.

As illustrated in FIG. 19, the swarm robot control apparatus 2000 according to another embodiment of the present disclosure may include an area designation unit 100', a start point selection unit 200', and a robot controller 300'. In this case, the area designation unit 100' may include an outer area designation unit 110' and an inner area designation unit 120'.

The outer area designation unit 110' may designate an outer assigned area for a plurality of robots based on respective current locations of the plurality of robots. As described above, the outer area designation unit 110' may designate an assigned area for each robot using a Voronoi diagram, based on a current location of each robot. The outer area designation unit 110' is substantially identical to the above-described area designation unit 100 of FIGS. 1 to 6, so a detailed description of the outer area designation unit 110' will be given with reference to FIGS. 1 to 6 and their related descriptions.

The inner area designation unit 120' may be provided with a map from the outer area designation unit 110'. That is, the outer area designation unit 110' may generate a map including coordinate information of each outer assigned area (e.g., substantially identical to each of the above assigned areas of FIGS. 1 to 6), coordinate information of each robot in each outer assigned area (e.g., substantially identical to each of the above assigned areas of FIGS. 1 to 6), and coordinate information of moving points of each outer assigned area (e.g., substantially identical to each of the above assigned areas of FIGS. 1 to 6), and this map may be sent to the inner area designation unit 120'.

The inner area designation unit 120' may designate inner assigned areas based on outer assigned areas designated by the outer area designation unit 110'. For example, as illustrated in FIG. 20, the inner area designation unit 120' may designate first to fifteenth inner assigned areas a1 to a15 corresponding to first to fifteenth outer assigned areas A1 to A15 for first to fifteenth robots P1 to P15.

An inner assigned area may be positioned within a corresponding outer assigned area. In other words, an inner assigned area may be enclosed by a corresponding outer assigned area. For example, a pair of an outer assigned area and an inner assigned area may enclose the same robot, and the inner assigned area may be enclosed by the outer assigned area. For example, as illustrated in FIG. 20, a pair of the fourth outer assigned area A4 and the fourth inner assigned area a4 may enclose the same robot, e.g., the fourth robot P4. In this instance, the fourth inner assigned area a4 may be disposed within the fourth outer assigned area A4, and the fourth inner assigned area a4 may be enclosed by the fourth outer assigned area A4.

An inner assigned area may have a smaller area than its corresponding outer assigned area. For example, the fourth inner assigned area a4 may have a smaller area than the fourth outer assigned areas A4.

An inner assigned area may have a similar shape to its corresponding outer assigned area. In other words, an inner assigned area may have a smaller size (e.g., area) than, but having the same shape as its corresponding outer assigned area. For example, the fourth inner assigned area a4 may have a smaller size than the fourth outer assigned area A4 and have the same shape as the fourth outer assigned area A4.

Moving points of an inner assigned area may be disposed to correspond one-on-one to moving points of an outer assigned area corresponding to that inner assigned area. In other words, moving points of an inner assigned area may be disposed to face moving points of an outer assigned area corresponding to that inner assigned area in a one-on-one manner. For example, as illustrated in FIG. 21, a first moving point Z1 of the fourth inner assigned area a4 may be disposed to correspond to a first moving point X1 of the fourth inner assigned area a4, a second moving point Z2 of the fourth inner assigned area a4 may be disposed to correspond to a second moving point X2 of the fourth outer assigned area A4, a third moving point Z3 of the fourth inner assigned area a4 may be disposed to correspond to a third moving point X3 of the fourth outer assigned area A4, a fourth moving point Z4 of the fourth inner assigned area a4 may be disposed to correspond to a fourth moving point X4 of the fourth outer assigned area A4, and a fifth moving point Z5 of the fourth inner outer area a4 may be disposed to correspond to a fifth moving point X5 of the fourth outer assigned area A4. In other words, the first moving point Z1 of the fourth inner assigned area a4 may be disposed to proximately face the first moving point X1 of the fourth outer assigned area A4, the second moving point Z2 of the fourth inner assigned area a4 may be disposed to proximately face the second moving point X2 of the fourth outer assigned area A4, the third moving point Z3 of the fourth inner assigned area a4 may be disposed to proximately face the third moving point X3 of the fourth outer assigned area A4, the fourth moving point Z4 of the fourth inner assigned area a4 may be disposed to proximately face the second moving point X4 of the fourth outer assigned area A4, and the fifth moving point Z5 of the fourth inner assigned area a4 may be disposed to proximately face the fifth moving point X5 of the fourth outer assigned area A4.

The inner assigned areas described as such may be designated as follows. For example, the inner area designation unit 120' may designate outer assigned areas using a Voronoi diagram, generate new vertices at a predetermined distance from the vertices of the designated outer assigned areas, respectively, in a direction toward the center of the outer assigned area, and designate (or generate) the above inner assigned area by joining the newly generated vertices. For example, as illustrated in FIG. 21, a new first moving point Z1 may be generated at a certain distance from the first moving point X1 of the fourth outer assigned area A4 in a direction toward the center (or fourth robot P4) of the fourth outer assigned area A4, a new second moving point Z2 may be generated at a certain distance from the second moving point X2 of the fourth outer assigned area A4 in a direction toward the center (or fourth robot P4) of the fourth outer assigned area A4, a new third moving point Z3 may be generated at a certain distance from the third moving point X3 of the fourth outer assigned area A4 in a direction toward the center (or fourth robot P4) of the fourth outer assigned area A4, a new fourth moving point Z4 may be generated at a certain distance from the fourth moving point X4 of the fourth outer assigned area A4 in a direction toward the center (or fourth robot P4) of the fourth outer assigned area A4, a new fifth moving point Z5 may be generated at a certain distance from the fifth moving point X5 of the fourth outer assigned area A4 in a direction toward the center (or fourth robot P4) of the fourth outer assigned area A4, and the fourth inner assigned area a4 may be generated which is enclosed and defined by lines connecting the new first to fifth moving points Z1 to Z5. In this case, the new first to fifth moving points Z1 to Z5 may be disposed in positions where they are spaced apart from the corresponding moving points X1 to X5 in the same proportion.

The inner area designation unit 120' may add more information on the inner assigned area of each robot to the above-mentioned map. For example, the inner area designation unit 120' may add, to the above-mentioned map, coordinate information of each inner assigned area, coordinate information of moving points of each inner assigned area, information on each inner assigned area and their corresponding outer assigned area, and information on the moving points of each inner assigned area and their corresponding moving points of the corresponding outer assigned area. Also, the map (hereinafter, corrected map) with information added by the inner area designation unit 100 may be provided to the start point selection unit 200' and the robot controller 300'.

The start point selection unit 200' may select a start moving point for each robot. For example, the start point selection unit 200' may select start moving points for the first to fifteenth robots P1 to P15. Based on the corrected map provided by the area designation unit 100'. In this case, the start point selection unit 200' selects a start moving point for each robot from the moving points defined on the outer assigned area of the corrected map. That is, the start point selection unit 200' of FIG. 19 is substantially identical to the above start point selection unit 200 described with reference to FIGS. 1 to 18. Accordingly, the candidate point selection unit 210' and start point determination unit 220' provided in the start point selection unit 200' of FIG. 19 are identical to the candidate point selection unit 210 and start point determination unit 220 of FIGS. 1 to 18. Meanwhile, the outer assigned areas are identical to the assigned areas of FIGS. 1 to 18. For example, the first fifteenth outer assigned areas of FIG. 20 are identical to the first to fifteenth assigned areas A1 to A15 of FIGS. 1 to 18, respectively. Therefore, a description of the candidate point selection unit 210' and start point determination unit 220' will be given with reference to FIG. 19. FIGS. 1 to 18 and their related descriptions.

In one embodiment, the robot controller 300' of FIG. 19 may move the robots to the corresponding moving points of the respective inner assigned areas, unlike the robot controller 300 of the foregoing embodiments related to FIGS. 1 to 18. For example, the robot controller 300 of FIG. 19 may detect a moving point of an inner assigned area that corresponds to a start point of an outer charged area from the provided corrected map, and move the robot to the detected moving point of the inner assigned area (hereinafter, a start moving point of the inner assigned area). For example, as illustrated in FIG. 21, the robot controller 300' may move the fourth robot P4 to the first start moving point Z1 of the fourth inner assigned area a4 which corresponds to the first start moving point X1 of the fourth outer assigned area A4.

As described above, once the start moving points for all of the robots forming a swarm have been selected and determined, each robot may move to its corresponding start moving point (e.g., a start moving point of the inner assigned area).

Afterwards, the robot controller 300' may control a robot that has arrived at its start moving point of the inner assigned area to move along the boundary of the inner assigned area for the robot. For example, as illustrated in FIG. 21, the robot controller 300' may control the fourth robot P4 to circulate in a clockwise direction along the boundary of the fourth inner assigned area a4. That is, as exemplified in FIG. 21, the fourth robot P4 arrives at the first moving point Z1 of the fourth inner assigned area a4 which is the start moving point, and then moves from the first moving point Z1 through the second moving point Z2, the third moving point Z3, the fourth moving point Z4, and the fifth moving point Z5 in a clockwise direction ①, ②, ③, ④, and ⑤. In this instance, after having arrived at the fifth moving point Z5, the fourth robot P4 may move over again through the first moving point Z1 in the clockwise direction. For example, the fourth robot P4 may continue to circulate clockwise along the boundary of the fourth inner assigned area a4. On the other hand, the fourth robot P4 may circulate along the boundary of the fourth inner assigned area a4 in a counterclockwise direction ①, ⑤, ④, ③, and ②, rather than in the above clockwise direction.

The other robots also may circulate along the boundary of the corresponding inner assigned area in a clockwise or counterclockwise direction in the same manner as the fourth robot P4.

In this case, each robot moves along the boundary of the inner assigned area where it does not overlap another robot, thereby preventing collisions between the robots in adjacent outer assigned areas.

In addition, the swarm robot control apparatus 1000 and 2000 according to the foregoing embodiment is also able to redesignate assigned areas for each specific period of time depending on the location of each of a plurality of robots.

Figure 22:
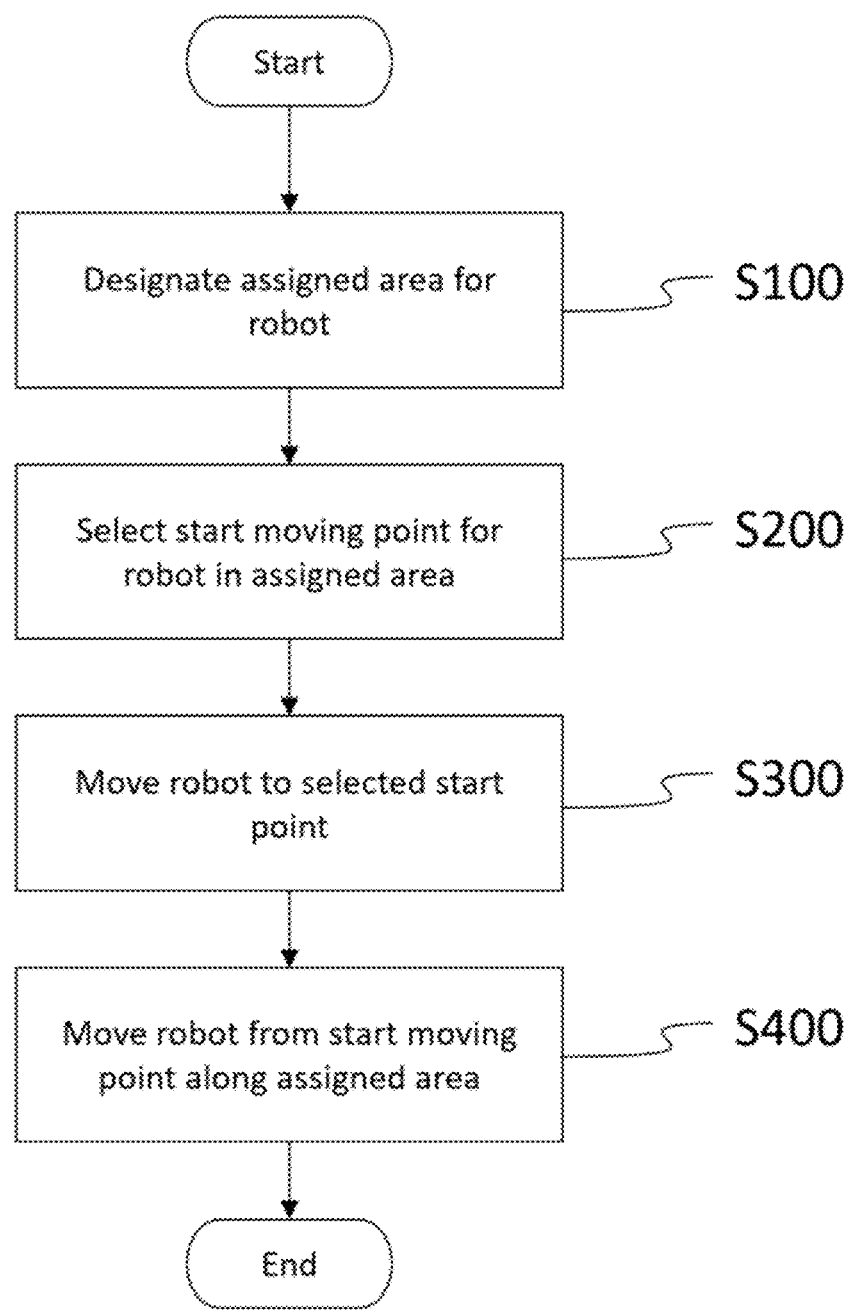
FIG. 22 is a flowchart for explaining a swarm robot control method according to one embodiment of the present disclosure.

FIG. 22 is a flowchart for explaining a swarm robot control method according to one embodiment of the present disclosure.

The swarm robot control method according to one embodiment of the present disclosure may include such steps as illustrated in FIG. 22.

For example, first, an area designation step S100 is performed to designate assigned areas for a plurality of robots based on respective current locations of the plurality of robots including a first robot. For example, the assigned areas for the plurality of robots may be designated using a Voronoi diagram, based on respective current locations of the plurality of robots including the first robot.

Afterwards, a start moving point selection step S200 is performed to select one of a plurality of moving points of a first assigned area as a start moving point for the first robot, based on information on distances between the first robot and the plurality of moving points defined by the first assigned area A1 for the first robot and information on whether there is an overlap between the first robot and other robots at the moving points of the first assigned area A1.

Next, a robot moving step S300 is performed to move the first robot to the selected start moving point.

Also, an additional moving step S400 may be performed to move the first robot to another moving point of the first assigned area A1 when the first robot has arrived at the start moving point.

Figure 23:
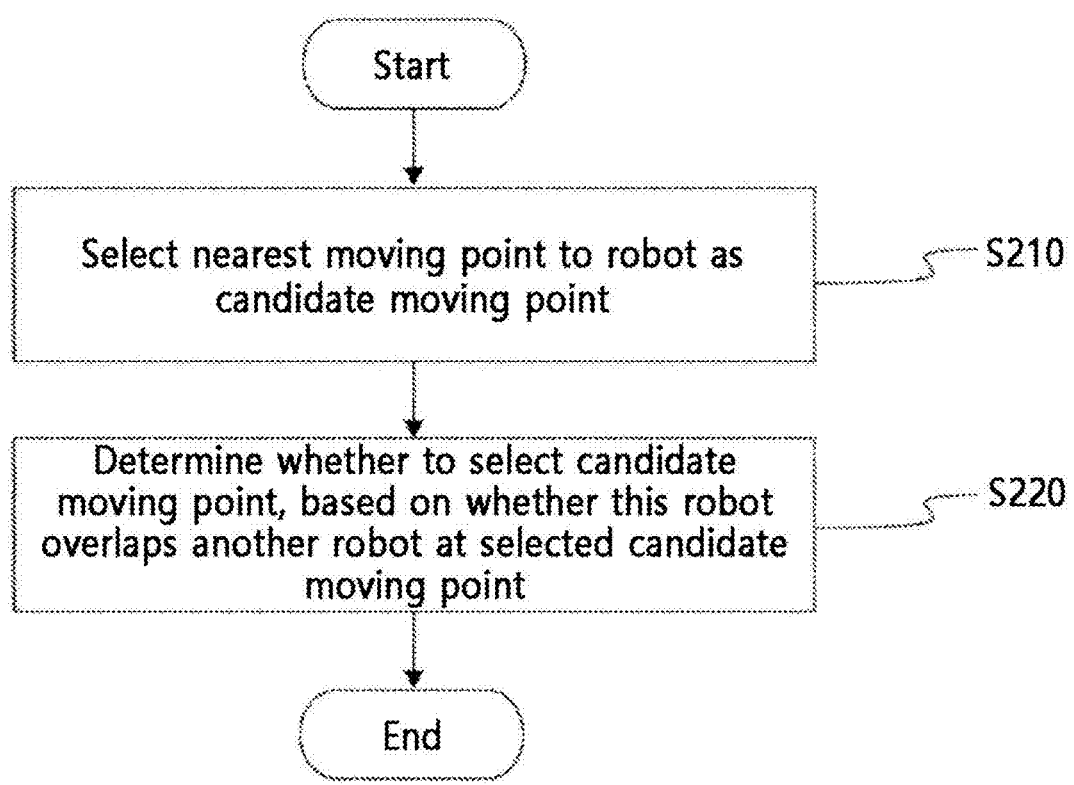
FIG. 23 is a flowchart for explaining a start moving point selection step of FIG. 22.

FIG. 23 is a flowchart for explaining a start moving point selection step of FIG. 22.

The start moving point selection step of FIG. 22 may include such steps as illustrated in FIG. 23.

For example, first, a candidate selection step S210 is performed to select the nearest moving point to the first robot as a candidate moving point from among the plurality of moving points of the first assigned area A1.

Subsequently, a determination step S220 is performed to determine whether to select the candidate moving point as the start moving point for the first robot, based on whether the first robot overlaps another robot at the selected candidate moving point.

FIG. 24 is a flowchart for explaining a determination step of FIG. 23.

The determination step of FIG. 22 may include such steps as illustrated in FIG. 24.

For example, upon determining that the first robot does not overlap another robot at the candidate moving point (for example, "No" in FIG. 24) in an overlap determination step S221, the candidate moving point may be determined to be the start moving point for the first robot, in the determination step S222.

On the other hand, upon determining that the first robot and another robot overlap at the candidate moving point (for example, "Yes" in FIG. 24) in the overlap determination step S221, a step of sending a candidate reselection request may be performed.

In response to this candidate reselection request, in the candidate selection step S210, the candidate moving point may be excluded from the plurality of moving points of the first assigned area A1, a rest of the moving points of the first assigned area A1, other than the excluded candidate moving point, may be redesignated as a plurality of redesignated moving points of the first assigned area A1, and the nearest moving point to the first robot may be reselected as a second candidate moving point from among the redesignated moving points of the first assigned area A1.

FIG. 25 is a flowchart for explaining a swarm robot control method according to another embodiment of the present disclosure.

The swarm robot control method according to another embodiment of the present disclosure may include such steps as illustrated in FIG. 25.

For example, first, an outer area designation step S110' is performed to designate outer assigned areas for a plurality of robots based on respective current locations of the plurality of robots including a first robot. For example, the outer assigned areas for the plurality of robots may be designated using a Voronoi diagram, based on respective current locations of the plurality of robots including the first robot.

Subsequently, an inner area designation step S120' is performed to designate inner assigned areas defined in the respective outer assigned areas and having a smaller area than the respective outer assigned areas.

Next, a start moving point selection step S200' is performed to select one of a plurality of moving points of a first outer assigned area as a start moving point for the first robot, based on information on distances between the first robot and the plurality of moving points defined by the first outer assigned area for the first robot and information on whether there is an overlap between the first robot and other robots at the moving points of the first outer assigned area.

Afterwards, a robot moving step S300' is performed to move the first robot to a moving point of the first inner assigned area that corresponds to the selected start moving point.

Also, an additional moving step S400' may be performed to move the first robot to another moving point of the first assigned area A1 when the first robot has arrived at the start moving point.

in this embodiment, the start moving point selection step S200' of FIG. 25 is substantially identical to the above-described start moving point selection step of FIG. 22.

According to various embodiments of the present disclosure, it may be understood that each block in flowcharts and combinations of the flowcharts may be performed by computer program instructions. Those computer program instructions may be contained in a processor in a general-purpose computer, special computer, or other programmable data processing equipment. Accordingly, the instructions, performed by the processor of the computer or other programmable data processing equipment, may produce a means for implementing functions described in the flowchart block(s). Those computer program instructions may be stored in a computer-usable or computer-readable memory oriented to a computer or other programmable data processing equipment in order to implement functions in a predetermined manner. Accordingly, the instructions, stored in the computer-usable or computer-readable memory, are capable of producing a manufactured item including an instruction means that implements the functions described in the flowchart block(s). The computer program instructions may be contained in a computer or other programmable data processing equipment (e.g., a processor). Accordingly, the instructions that produce a process, which is executed via the computer after a series of operations are performed in the computer or other programmable data processing equipment, and operate the computer or other programmable data processing equipment, may provide steps for executing the functions described in the flowchart block(s).

Each block may denote a module, segment, or part of code including one or more executable instructions for executing a specified logical function(s). In some alternatives, it should be noted that the functions mentioned in the blocks may be generated out of order. For example, two consecutive blocks may be performed substantially simultaneously or sometimes in reverse order depending on their corresponding functions.

In this instance, the term "~unit" used in embodiments, such as the area designation unit 100, the start point selection unit 200, etc., may refer to a software element or a hardware element such as FPGA or ASIC, and "~unit" may perform some functions. However, "~unit" is not limited to software or hardware, "unit" may be configured to be contained in an addressable storage medium, or may be configured to reproduce one or more processors. Therefore, for example, "~unit" may include elements, such as software elements, object-oriented software elements, class elements, and task elements, processes, functions, attributes, procedures, sub-routines, segments of a program code, drivers, firmware, microcode, circuit, data, database, data structures, tables, arrays, and variables. A function provided in the elements and "~units" may be implemented by coupling the functions of a smaller number of elements and "units" or may be implemented by separating the function to additional elements and "~unit". In addition, elements and "~unit" may be configured to reproduce one or more CPUs within a device or secure multimedia card. In addition, "~unit" in an embodiment may include one or more processors.

It would be appreciated by one of ordinary skill in the art that various changes may be made to the embodiments disclosed herein without changing the technical spirit or essential features. Thus, it should be understood that the embodiments of the disclosure are exemplary in all aspects but not limiting. It should be understood that the scope of the present disclosure is defined not by the description but by the appended claims, and all changes, modifications, or equivalents thereto also belong to the scope of the present disclosure.

While preferred embodiments of the present disclosure have been shown and described using particular terms in the specification and the drawings, this is simply for a better understanding of the present disclosure and should not be construed as limiting the present disclosure. It is apparent to one of ordinary skill in the art that other various changes may be made to the embodiments disclosed herein without departing from the scope of the present disclosure.

What is claimed is:

1. A swarm robot control apparatus comprising:
an area designation unit that designates a plurality of assigned areas for a plurality of robots based on respective current locations of the plurality of robots including a first robot;
a start point selection unit that selects one of a plurality of moving points defined by a first assigned area of the plurality of assigned areas as a start moving point for the first robot, based on information on distances between the first robot and the plurality of moving points of the first assigned area defined for the first robot and information on whether one or more of the plurality of moving points is previously selected by other robots among the plurality of robots; and
a robot controller that moves the first robot to the start moving point selected by the start point selection unit,
wherein each of the plurality of moving points is a vertex of a plurality of vertices that define a cell of a Voronoi diagram,
wherein the first robot performs a movement by circularly traversing each of the plurality of vertices, and the start moving point of the movement is one of the plurality of vertices,
wherein the start moving point for each of the plurality of robots is determined sequentially and the robot controller moves each of the plurality of robots to a corresponding start moving point simultaneously after the start moving point for each of the plurality of robots is determined.

2. The swarm robot control apparatus of claim 1, wherein the start point selection unit includes:
a candidate point selection unit that selects a nearest moving point to the first robot as a candidate moving point from among the plurality of moving points of the first assigned area; and
a start point determination unit that determines whether to select the candidate moving point as the start moving point for the first robot, based on whether the selected candidate moving point for the first robot is previously selected by a second robot among the plurality of robots.

3. The swarm robot control apparatus of claim 2, wherein, upon determining that the candidate moving point is not previously selected by the second robot, the start point determination unit determines the candidate moving point to be the start moving point for the first robot.

4. The swarm robot control apparatus of claim 2, wherein:
upon determining that the candidate moving point is previously selected by the second robot, the start point determination unit sends a reselection signal to the candidate point selection unit, and in response to the reselection signal, the candidate point selection unit excludes the candidate moving point from the plurality of moving points of the first assigned area, redesignates a rest of the moving points of the first assigned area, other than the excluded candidate moving point, as a plurality of redesignated moving points of the first assigned area, and reselects a nearest moving point to the first robot as a second candidate moving point from among the redesignated moving points of the first assigned area.

5. The swarm robot control apparatus of claim 1, wherein the robot controller controls the first robot to move to another moving point of the first assigned area when the first robot has arrived at the start moving point.

6. The swarm robot control apparatus of claim 5, wherein the robot controller controls the first robot to move to other moving points of the first assigned area sequentially in a preset direction from the start moving point of the first assigned area.

7. The swarm robot control apparatus of claim 6, wherein the preset direction includes either a clockwise direction or a counterclockwise direction from the start moving point of the first assigned area.

8. The swarm robot control apparatus of claim 2, wherein a start moving point for the second robot is set earlier than the start moving point for the first robot.

9. The swarm robot control apparatus of claim 1, wherein the area designation unit designates the plurality of assigned areas for the plurality of robots using the Voronoi diagram having one or more polygon including at least three vertices based on the respective current locations of the plurality of robots including the first robot.

10. The swarm robot control apparatus of claim 2, wherein, when there are at least two nearest moving points to the first robot from among the plurality of moving points of the first assigned area, the candidate point selection unit compares angles between the at least two moving points and the direction the first robot is heading in to each other, and selects one of the at least two moving points as the candidate moving point based on a result of comparing the angles.

11. The swarm robot control apparatus of claim 10, wherein the candidate point selection unit selects a moving point whose angle to the direction the robot is heading in is the smallest as the candidate moving point, from among the at least two moving points.

12. The swarm robot control apparatus of claim 4, wherein, when there is no more moving points that can be reselected by the candidate point selection unit in response to the reselection signal, the start point determination unit determines the nearest moving point to the first robot, among the plurality of moving points initially defined by the first assigned area, to be the start moving point for the first robot.

13. A swarm robot control apparatus comprising:
an outer area designation unit that designates a plurality of outer assigned areas for a plurality of robots based on respective current locations of the plurality of robots including a first robot;
an inner area designation unit that designates a plurality of inner assigned areas, each defined within the respective one of the plurality of outer assigned areas and having a smaller area than the respective outer assigned area;
a start point selection unit that selects one of a plurality of moving points defined by a first outer assigned area of the plurality of outer assigned areas as a start moving point for the first robot, based on information on distances between the first robot and the plurality of moving points of the first outer assigned area defined for the first robot and information on whether one or more of the plurality of moving points of the first outer assigned area is previously selected by other robots among the plurality of robots; and
a robot controller that moves the first robot to a start moving point of a first inner assigned area that corresponds to the start moving point selected by the start point selection unit,
wherein each of the plurality of moving points defined by the first outer assigned area is a vertex of a plurality of first vertices that form a cell of a Voronoi diagram,
wherein the first inner assigned area for the first robot has the same shape as the outer assigned area for the first robot,
wherein the first robot performs a movement by circularly traversing each of a plurality of second vertices defined by the first inner assigned area, and the start moving point of the movement is one of the plurality of second vertices.

14. A swarm robot control method implementable by a processor, the method comprising:
designating, by the processor, a plurality of assigned areas for a plurality of robots based on respective current locations of the plurality of robots including a first robot;
selecting, by the processor, one of a plurality of moving points defined by a first assigned area as a start moving point for the first robot, based on information on distances between the first robot and the plurality of moving points of the first assigned area defined for the first robot and information on whether one or more of the plurality of moving points is previously selected by other robots among the plurality of robots; and
controlling, by the processor, the first robot to move to the selected start moving point based on a result of the selecting of one of the plurality of moving points,
wherein each of the plurality of moving points is a vertex of a plurality of vertices that define a cell of a Voronoi diagram,
wherein the first robot performs a movement by circularly traversing each of the plurality of vertices, and the start moving point of the movement is one of the plurality of vertices,
wherein the start moving point for each of the plurality of robots is determined sequentially, and
wherein the method further comprising controlling, by the processor, each of the plurality of robots to move to a corresponding start moving point simultaneously after the start moving point for each of the plurality of robots is determined.

15. The swarm robot control method of claim 14, wherein the selecting of one of the plurality of moving points includes:
a candidate point selection step of selecting a nearest moving point to the first robot as a candidate moving point from among the plurality of moving points of the first assigned area; and
a determination step of determining whether to select the candidate moving point as the start moving point for the first robot, based on whether the selected candidate moving point for the first robot is previously selected by a second robot among the plurality of robots.

16. The swarm robot control method of claim 15, wherein the determination step includes, upon determining that the candidate moving point is not previously selected by the second robot, determining the candidate moving point to be the start moving point for the first robot, and, upon determining that the candidate moving point is previously selected by the second robot, sending a candidate reselection request to the processor, and the candidate selection step includes, in response to the candidate reselection request, excluding the candidate moving point from the plurality of moving points of the first assigned area, redesignating a rest of the moving points of the first assigned area, other than the excluded candidate moving point, as a plurality of redesignated moving points of the first assigned area, and reselecting a nearest moving point to the first robot as a second candidate moving point from among the redesignated moving points of the first assigned area.

17. A swarm robot control method implementable by a processor, the method comprising:

designating, by the processor, a plurality of outer assigned areas for a plurality of robots based on respective current locations of the plurality of robots including a first robot;

designating, by the processor, a plurality of inner assigned areas, each defined within the respective one of the plurality of outer assigned areas and having a smaller area than the respective outer assigned area;

selecting, by the processor, one of a plurality of moving points defined by a first outer assigned area of the plurality of outer assigned areas as a start moving point for the first robot, based on information on distances between the first robot and the plurality of moving points of the first outer assigned area defined for the first robot and information on whether one or more of the plurality of moving points of the first outer assigned area is previously selected by other robots among the plurality of robots; and controlling, by the processor, the first robot to move to a start moving point of a first inner assigned area that corresponds to the start moving point based on a result of the selecting of one of the plurality of moving points, wherein each of the plurality of moving points defined by the first outer assigned area is a vertex of a plurality of first vertices that form a cell of a Voronoi diagram, wherein the first inner assigned area for the first robot has the same shape as the outer assigned area for the first robot, wherein the first robot performs a movement by circularly traversing each of a plurality of second vertices defined by the first inner assigned area, and the start moving point of the movement is one of the plurality of second vertices.

* * * * *